(12) United States Patent
Vachhani et al.

(10) Patent No.: US 12,548,599 B2
(45) Date of Patent: Feb. 10, 2026

(54) GENERATING CONTEXTUAL TRANSITION EFFECTS IN VIDEOS

(71) Applicant: SAMSUNG ELECTRONICS CO., LTD., Suwon-si (KR)

(72) Inventors: Jayesh Rajkumar Vachhani, Bengaluru (IN); Sourabh Vasant Gothe, Belagavi (IN); Vibhav Agarwal, Bengaluru (IN); Barath Raj Kandur Raja, Bengaluru (IN); Likhith Amarvaj, Bengaluru (IN); Rishabh Khurana, Dehradun (IN); Satyam Kumar, Patna (IN); Pranay Kashyap, Greater Noida (IN); Karri Hima Satya Hemanth, Bengaluru (IN); Himanshu Arora, Bengaluru (IN); Yashwant Saini, Alwar (IN); Sourav Ghosh, Kolkata (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/612,804

(22) Filed: Mar. 21, 2024

(65) Prior Publication Data

US 2024/0321318 A1     Sep. 26, 2024

Related U.S. Application Data

(63) Continuation of application No. PCT/KR2024/003373, filed on Mar. 18, 2024.

(30) Foreign Application Priority Data

Mar. 21, 2023  (IN) .............................. 202341019598
Feb. 9, 2024   (IN) .............................. 202341019598

(51) Int. Cl.
    *G11B 27/036*     (2006.01)
    *G06T 7/20*       (2017.01)
    (Continued)

(52) U.S. Cl.
    CPC .............. *G11B 27/036* (2013.01); *G06T 7/20* (2013.01); *G06V 10/761* (2022.01); *G06V 20/44* (2022.01);
    (Continued)

(58) Field of Classification Search
    None
    See application file for complete search history.

(56) References Cited

U.S. PATENT DOCUMENTS

| 9,870,798 B2  | 1/2018 | Pribula          |
| 10,645,468 B1 | 5/2020 | Kislevitz et al. |

(Continued)

FOREIGN PATENT DOCUMENTS

| CN | 110248115 A | 9/2019 |
| CN | 109688463 B | 2/2020 |

(Continued)

OTHER PUBLICATIONS

Zhou, Siwei et al., "Emotion Recognition from Large-Scale Video Clips with Cross-Attention and Hybrid Feature Weighting Neural Networks", International Journal of Environmental Research and Public Health, Jan. 12, 2023, vol. 20, No. 1400. (23 pages total).

(Continued)

*Primary Examiner* — Hung Q Dang
(74) *Attorney, Agent, or Firm* — Sughrue Mion, PLLC

(57) ABSTRACT

A method may include obtaining a plurality of frames of at least one video; determining an occurrence of a change from a first event of the at least one video to a second event of the video; determining a location in the plurality of frames; inserting one or more masked frames at the location between (Continued)

at least one frame of the first event and at least one frame of the second event; determining at least one transition component present in the at least one frame of the first event and the at least one frame of the second event; determining a motion of pixels for the at least one transition component across the plurality of frames of the first event and the plurality of frames of the second event; providing at least one transition effect in the one or more masked frames between the first event and the second event.

18 Claims, 20 Drawing Sheets

(51) Int. Cl.
*G06V 10/74* (2022.01)
*G06V 10/82* (2022.01)
*G06V 20/40* (2022.01)
*G11B 27/031* (2006.01)
*G11B 27/34* (2006.01)

(52) U.S. Cl.
CPC .... *G11B 27/34* (2013.01); *G06T 2207/10016* (2013.01)

(56) References Cited

U.S. PATENT DOCUMENTS

| | | | |
|---|---|---|---|
| 10,692,537 B2 | 6/2020 | Eppolito et al. | |
| 10,694,223 B2 | 6/2020 | Cormican | |
| 10,741,213 B1 | 8/2020 | Selby | |
| 11,153,657 B1 | 10/2021 | Woodman | |
| 11,157,154 B2 | 10/2021 | Matsuda et al. | |
| 11,438,510 B2 | 9/2022 | Chun | |
| 11,468,914 B2 | 10/2022 | Mathias et al. | |
| 2008/0298781 A1* | 12/2008 | Yanagihara | H04N 21/43072 386/231 |
| 2009/0122081 A1 | 5/2009 | Tsubaki et al. | |
| 2009/0190900 A1* | 7/2009 | Lee | H04N 5/85 386/280 |
| 2013/0235223 A1* | 9/2013 | Park | H04N 5/272 348/E5.051 |
| 2015/0071605 A1 | 3/2015 | Ogawa et al. | |
| 2015/0078733 A1 | 3/2015 | Popkiewicz et al. | |
| 2020/0118594 A1 | 4/2020 | Oxholm et al. | |
| 2020/0135075 A1 | 4/2020 | Cook | |
| 2023/0022105 A1* | 1/2023 | Ma | G06T 7/60 |

FOREIGN PATENT DOCUMENTS

| | | |
|---|---|---|
| CN | 113538271 A | 10/2021 |
| CN | 113691758 A | 11/2021 |
| WO | 2022/250439 A1 | 12/2022 |

OTHER PUBLICATIONS

Feichtenhofer, Christoph, "X3D: Expanding Architectures for Efficient Video Recognition", Computer Vision Foundation, 2020. (11 pages total).

International Search Report dated Jun. 24, 2024, issued by the International Searching Authority in International Application No. PCT/KR2024/003373.

* cited by examiner

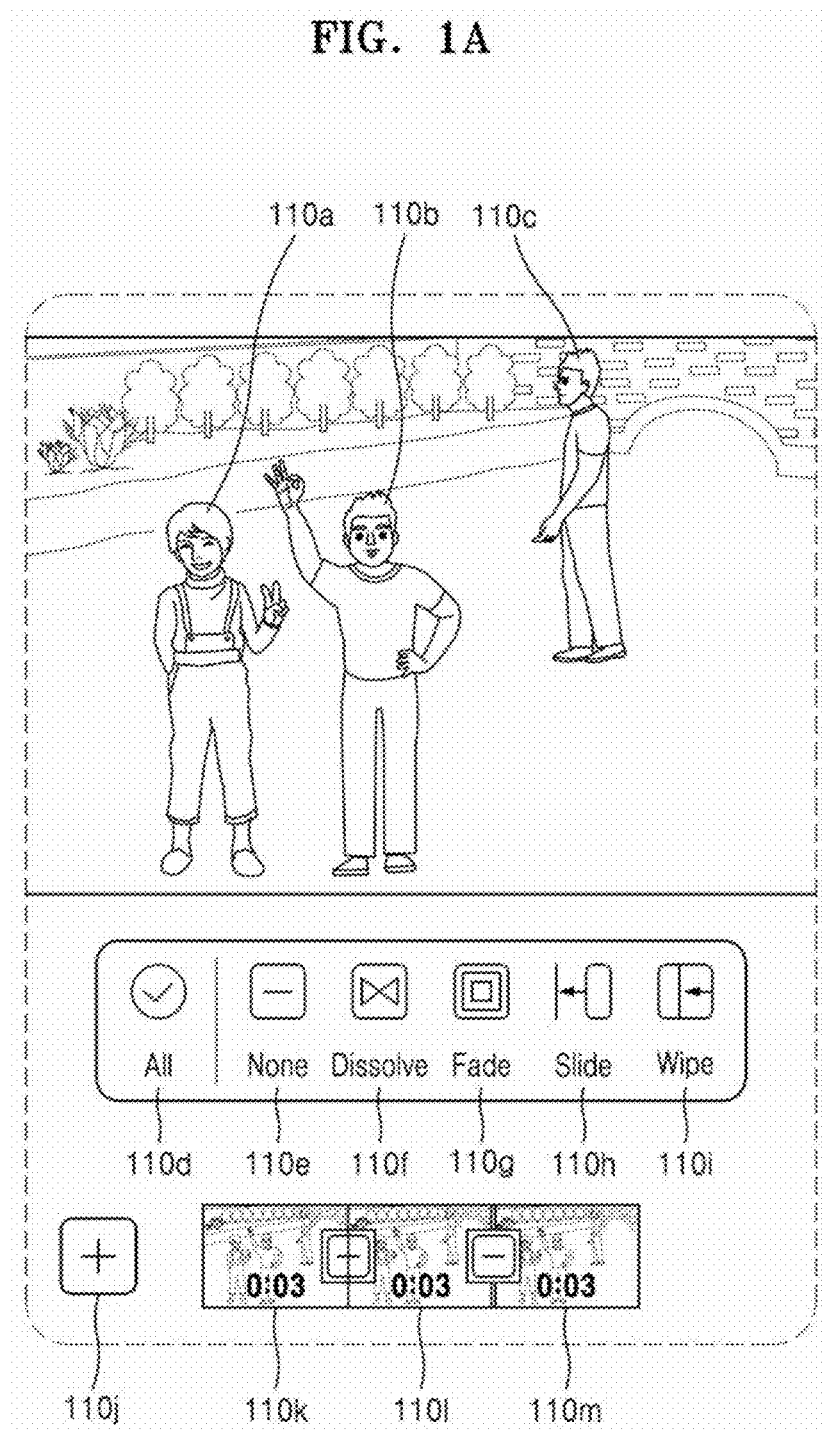

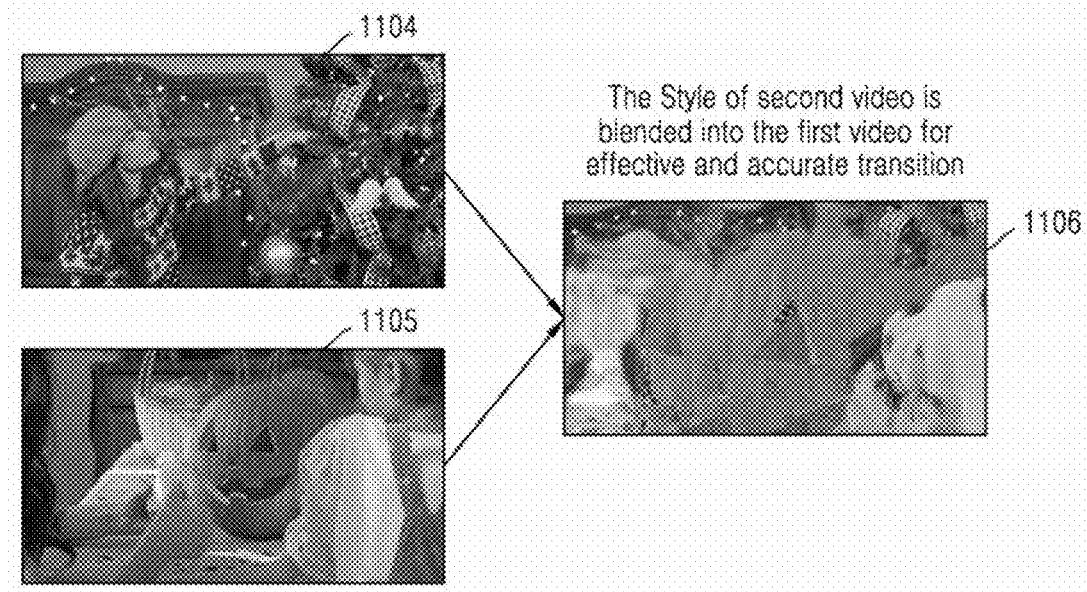

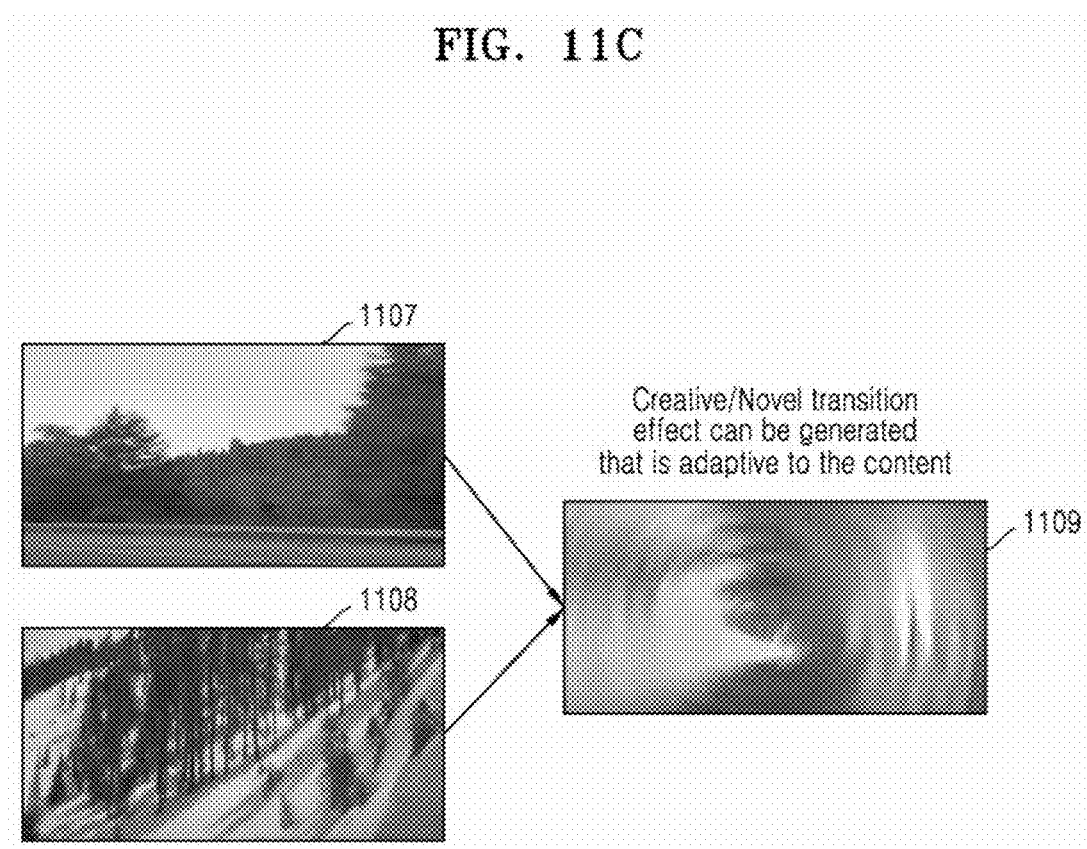

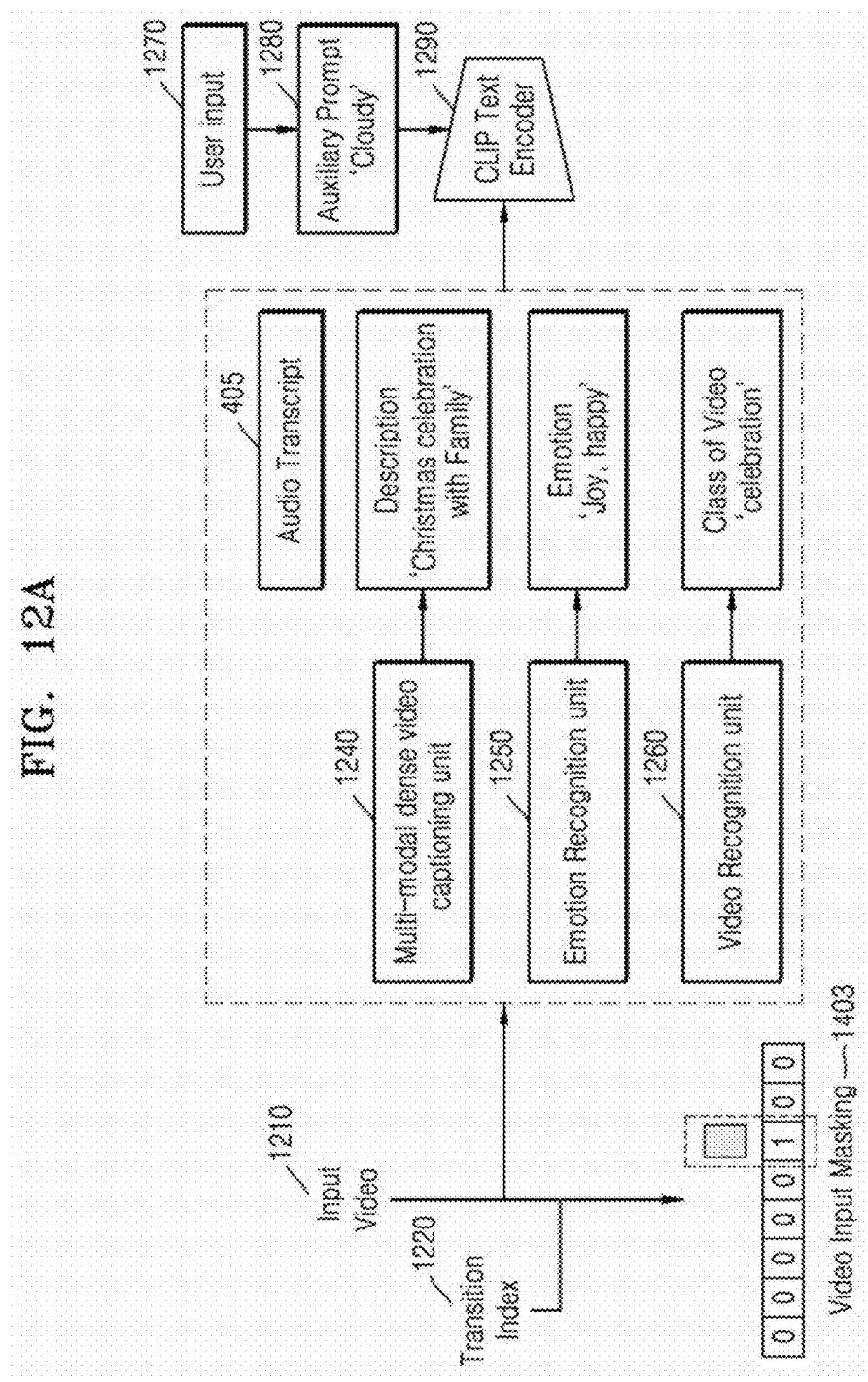

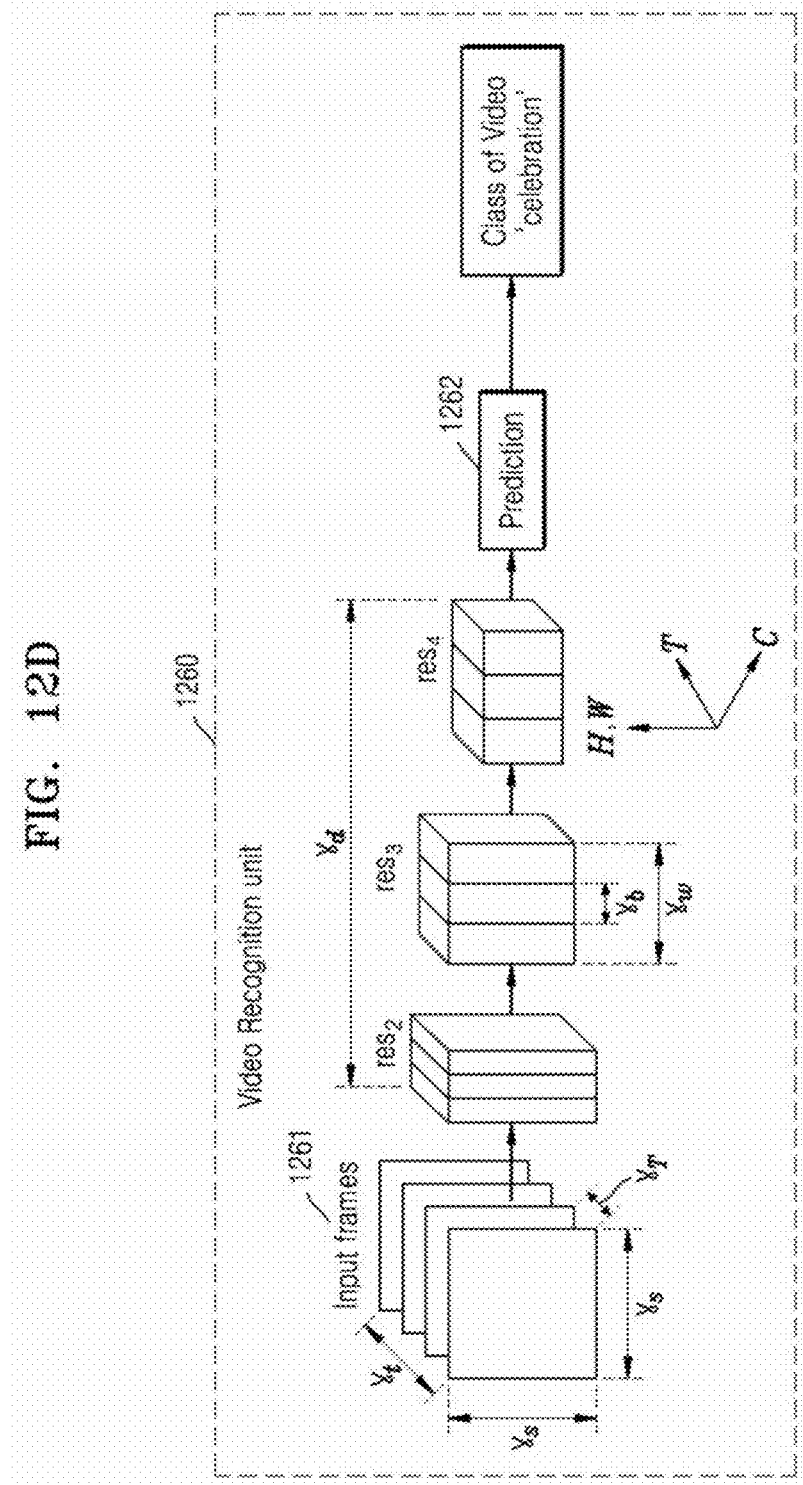

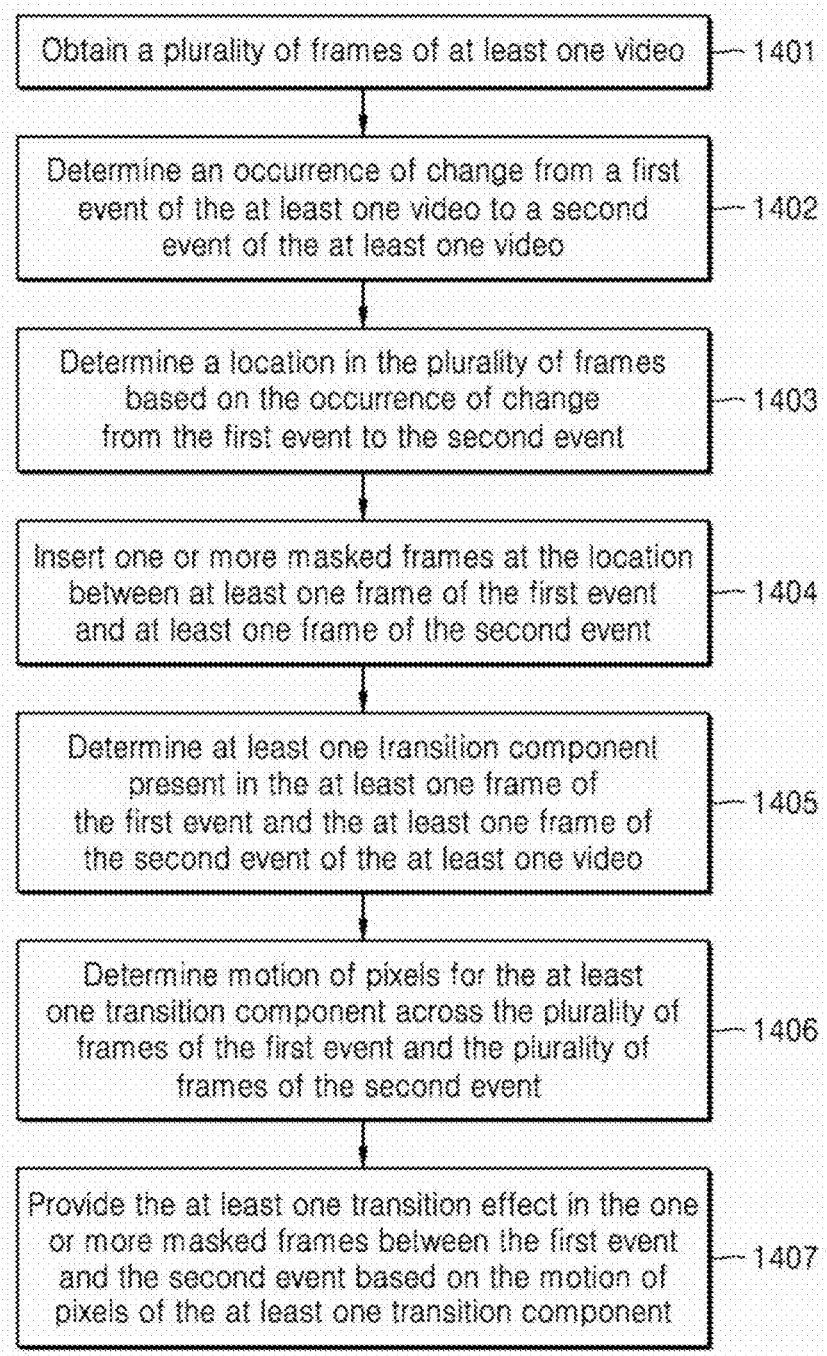

GENERATING CONTEXTUAL TRANSITION EFFECTS IN VIDEOS

CROSS-REFERENCE TO RELATED APPLICATIONS

This application is a by-pass continuation application of International Application No. PCT/KR2024/003373, filed on Mar. 18, 2024, which is based on and claims priority to Indian Provisional Patent Application No. 202341019598, filed on Mar. 21, 2023, and Indian Complete Patent Application No. 202341019598, filed on Feb. 9, 2024, in the Indian Intellectual Property Office, the disclosures of which are incorporated by reference herein their entireties.

BACKGROUND

1. Field

The disclosure relates to a field of media processing in an electronic device, and more particularly, relates to a method and the electronic device for generating contextual transition effects in videos.

2. Description of Related Art

Traditionally, individuals (i.e., users of the electronic device) have been able to record videos on their electronic devices, but the outcome of such recordings often fall short in terms of quality when compared to professionally produced and edited videos. As a result, the individuals are less apt to invest time in an editing process, which is considered to be quite time-consuming. Presently, an existing video display method involves a step of capturing video segments from the plurality of videos for splicing and playing, which is carried out manually and independently. In order to appropriately capture necessary video segments, the individuals may manually compare the contents of the plurality of video frames. Thus, special effects and splicing of the video are also designed manually and independently, while an expression form of the edited videos remains inflexible. Furthermore, it takes relatively long to edit the video segments and the special effects. Nevertheless, the individuals now have the ability to create edited videos from the plurality of video frames.

FIG. 1A displays multiple progress bars within a user interface of the electronic device, in related art. Each progress bar represents the length of individual video clips (110k, 110l, 110m). This representation necessitates the users to switch between different video clips, while editing the video clips in a traditional video editing application as demonstrated in the FIG. 1A. Predefined transition options are included in the traditional video editing application, and traditional media frames (single or the plurality of images or videos) can be customized or edited using transitions such as dissolve (110f), fade (110g), slide (110h), wipe (110i), none (110e), and others. Additionally, transitional animations are chosen from a database and added based on a user input. The video clips to be edited are previewed by the users.

FIG. 1B depicts an operation of generation of existing transition effects in the videos, in the related art. The transition from a first interface 120a to a second interface 120b is illustrated in the FIG. 1B. The first interface 120a is a user's home screen associated with the electronic device, while the user requests for the second interface 101b. The second interface 101b may include numerous applications (App 1 121b, App 2 122b, App 3 123b, . . . , App n 120n). In an unlock scenario, the first interface can move from so-called 'always on display' (AOD) screen to a lock screen and further the lock screen to the home screen. In methods of the related art, the transition between the first interface (120a) and the second interface (120b) is predetermined.

SUMMARY

Provided are a method and an electronic device for generating contextual transition effects in videos. The disclosure facilitates seamless automatic transition of the videos based on the transition components.

Provided are generative transitions based on flow guided video diffusion. These transitions include seamless and intuitive transitions for wallpaper scenarios (such as transitioning from a lock screen to a home screen) and contextually relevant transitions for the purpose of creating motion pictures.

Provided is an operation to determine the occurrence of transition boundaries from a first event of the video to a second event of the videos by detecting degree similarities between the frames. The location of frames, where the occurrence of transition change is identified, is then marked as a suitable position for creating transition effects and insert masked frames.

Provided is an operation to determine transition components within the frames of both the first event and the second event in the videos. The operation involves detecting the motion of pixels for these transition components across the frames of both events and updating pixel values of masked frames accordingly to create seamless transition effects between the two events.

Provided is an operation to determine one or more supplementary prompts (such as an audio or emotion) within the frames of the video to enhance the formation of transition effect.

According to an embodiment of the disclosure, a method may include obtaining a plurality of frames of at least one video. According to an embodiment of the disclosure, a method may include determining an occurrence of a change from a first event of the at least one video to a second event of the at least one video. According to an embodiment of the disclosure, a method may include determining a location in the plurality of frames, based on the occurrence of the change from the first event to the second event. According to an embodiment of the disclosure, a method may include inserting one or more masked frames at the location between at least one frame of the first event and at least one frame of the second event. According to an embodiment of the disclosure, a method may include determining at least one transition component present in the at least one frame of the first event and the at least one frame of the second event. According to an embodiment of the disclosure, a method may include determining a motion of pixels for the at least one transition component across the plurality of frames of the first event and the plurality of frames of the second event. According to an embodiment of the disclosure, based on the motion of pixels of the at least one transition component, a method may include providing at least one transition effect in the one or more masked frames between the first event and the second event.

According to an embodiment of the disclosure, the transition model may be configured to obtain a plurality of frames of at least one video. According to an embodiment of the disclosure the transition model may be configured to determine an occurrence of a change from a first event of the at least one video to a second event of the at least one video.

According to an embodiment of the disclosure, the transition model may be configured to determine a location in the plurality of frames, based on the occurrence of the change from the first event to the second event. According to an embodiment of the disclosure, the transition model may be configured to insert one or more masked frames at the location between at least one frame of the first event and at least one frame of the second event. According to an embodiment of the disclosure, the transition model may be configured to determine at least one transition component present in the at least one frame of the first event and the at least one frame of the second event of the at least one video. According to an embodiment of the disclosure, the transition model may be configured to determine a motion of pixels for the at least one transition component across the plurality of frames of the first event and the plurality of frames of the second event. According to an embodiment of the disclosure, based on the motion of pixels of the at least one transition component, the transition model may be configured to provide at least one transition effect in the one or more masked frames between the first event and the second event.

According to an embodiment of the disclosure, A non-transitory computer-readable storage medium storing instructions which when executed by at least one processor is provided. According to an embodiment of the disclosure, the at least one processor may be configured to obtain a plurality of frames of at least one video. According to an embodiment of the disclosure, the at least one processor may be configured to determine an occurrence of a change from a first event of the at least one video to a second event of the at least one video. According to an embodiment of the disclosure, the at least one processor may be configured to determine a location in the plurality of frames, based on the occurrence of the change from the first event to the second event. According to an embodiment of the disclosure, the at least one processor may be configured to insert one or more masked frames at the location between at least one frame of the first event and at least one frame of the second event. According to an embodiment of the disclosure, the at least one processor may be configured to determine at least one transition component present in the at least one frame of the first event and the at least one frame of the second event of the at least one video. According to an embodiment of the disclosure, the at least one processor may be configured to determine a motion of pixels for the at least one transition component across the plurality of frames of the first event and the plurality of frames of the second event. According to an embodiment of the disclosure, based on the motion of pixels of the at least one transition component, the at least one processor may be configured to provide at least one transition effect in the one or more masked frames between the first event and the second event.

BRIEF DESCRIPTION OF THE DRAWINGS

The disclosure is illustrated in the accompanying drawings, throughout which like reference letters indicate corresponding parts in the various figures. The embodiments herein will be better understood from the following description with reference to the drawings, in which:

FIG. 1A illustrates a video editing application that showcases pre-existing transition features, according to the related art;

FIG. 11B is a visual representation of images or videos after transition by applying transition loss, according to the embodiments of the disclosure;

FIG. 11C is a visual representation that illustrates the impact and role of motion loss of the model by guiding the model to generate transition which is adaptive to content, according to the embodiments of the disclosure;

FIG. 12A is a block diagram that illustrates a dynamic prompt generator for generating the contextual transition effects within the videos, according to the embodiments of the disclosure;

FIG. 12D is a block diagram that illustrates a video recognition unit for generating the contextual transition effects within the videos, according to the embodiments of the disclosure;

FIG. 14 is a flow diagram that illustrates a method for generating the contextual transition effects within the videos, according to the embodiments of the disclosure.

Figure 1B:
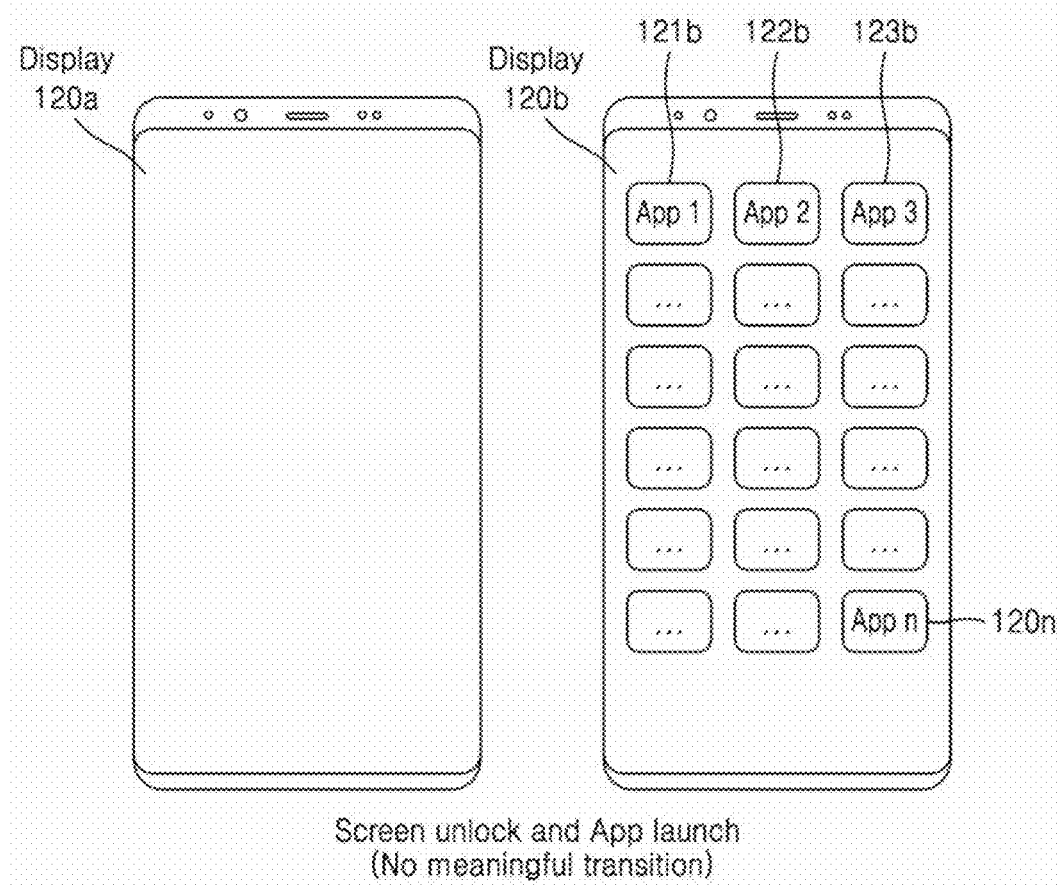
FIG. 1B illustrates an operation of production of existing transition effects in videos, according to the related art.

To the extent possible, like reference numerals have been used to represent like elements in the drawing. Further, those of ordinary skill in the art will appreciate that elements in the drawing are illustrated for simplicity and cannot have been necessarily drawn to scale. For example, the dimension of some of the elements in the drawing can be exaggerated relative to other elements to help to improve the understanding of aspects of the invention. Furthermore, the elements can have been represented in the drawing by conventional symbols, and the drawings can show only those specific details that are pertinent to the understanding the embodiments of the invention so as not to obscure the drawing with details that will be readily apparent to those of ordinary skill in the art having benefit of the description herein.

DETAILED DESCRIPTION

One or more embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Also, the one or more embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. The expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Moreover, multiple functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Embodiments of the disclosure provide a method and an electronic device for generating transition effects in videos. The method includes receiving a plurality of frames of the one or more videos, and determining an occurrence of change from a first event of the one or more videos to a second event of the one or more videos. Further, the method includes determining a location in the plurality of frames based on the occurrence of change from the first event to the second event. Further, the method includes inserting one or more masked frames at the location between the plurality of frames of the first event and the plurality of frames of the second event. Further, the method includes determining transition components present in the plurality of frames of the first event and the plurality of frames of the second event of the videos. Further, the method includes determining motion of pixels for the transition components across the plurality of frames of the first event and the plurality of frames of the second event. Furthermore, the method includes creating the transition effects in one or more masked frames between the first event and the second event based on the motion of pixels of the transition components.

The disclosure proposes an operation of featuring implicit identification of transition components based on parameters such as object of interest in frames or events in frames. This is accomplished by utilizing non-causal spatiotemporal attention, and pixel-wise frame motion generation is executed using a diffusion probabilistic model.

In contrast to the pre-existing techniques, the proposed method can be used to intelligently identify the transition points through a temporal similarity matrix, thus, resulting in transitions that are contextually pleasing.

The proposed method can be used to determine the occurrence of the transition from the first event to the second event in the videos by detecting similarities among the frames. The location of frames, where the transition occurs, is then marked as a suitable position for creating the transition effect.

The proposed method can be used to determine the transition components within the frames of both the first event and second event in the videos. This involves detecting the motion of pixels for these transition components across the frames of both events and updating the pixel values of the masked frames accordingly to create the contextual transition effects between the two events.

The proposed method can be used to determine one or more supplementary prompts (such as audio or emotion) within the frames of the videos to enhance the formation of transition effects.

The transition effect can be only one and more than one. The word 'transition effect' is used in singular manner in some places for illustration purpose and not considered as limitation.

Throughout the description the terms 'video clips', 'video segments' or 'media segments' are used interchangeably.

Throughout the description the terms 'one or more frames', 'plurality of frames' or 'media frames' or 'multiple frames' are used interchangeably.

Referring now to the drawings, and more particularly to FIGS. 2 through 14, where similar reference characters denote corresponding features consistently throughout the figures, there are shown at least one embodiment.

Figure 2:
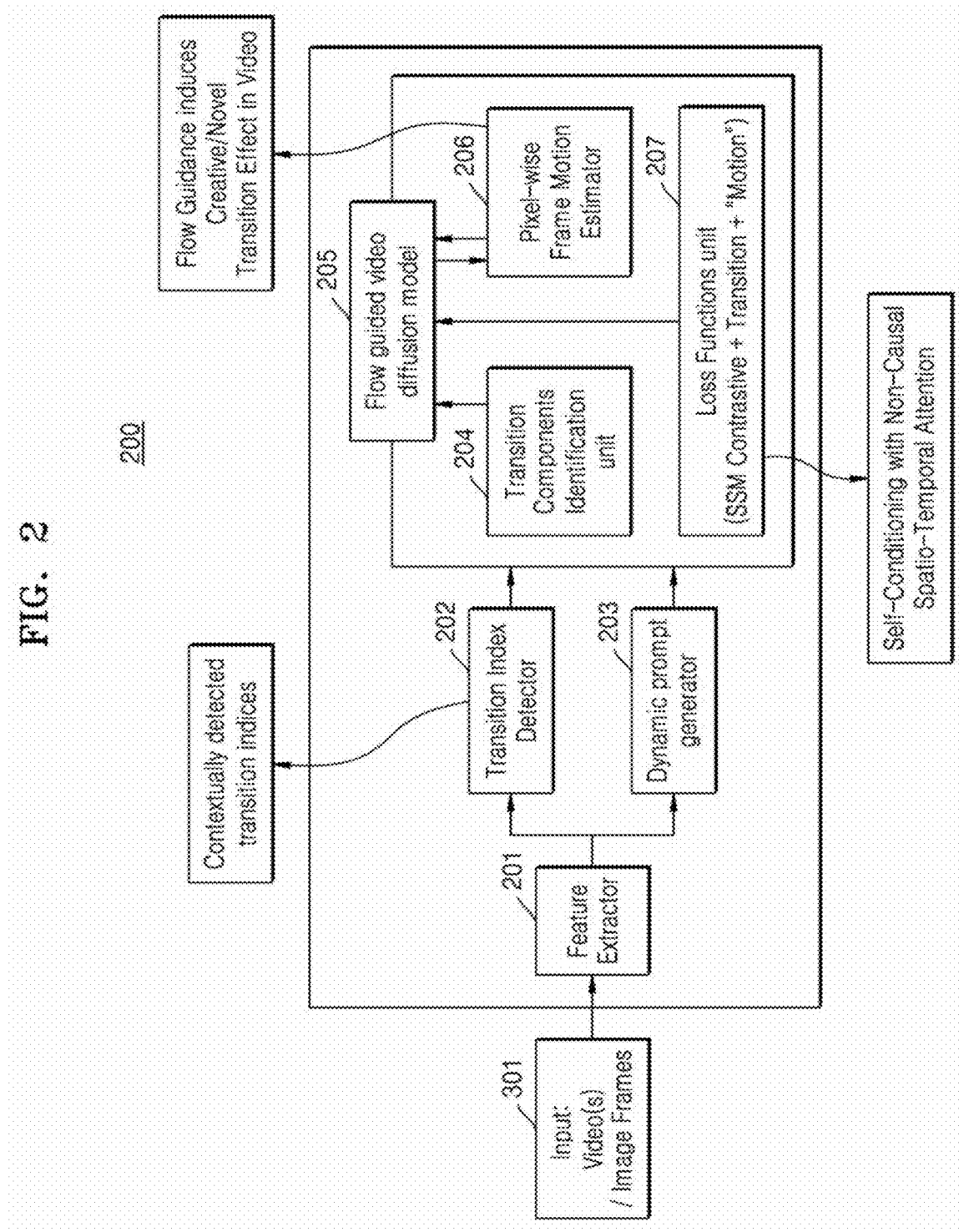
FIG. 2 is an architecture illustrating generation of transition effects through the utilization of a flow-guided video diffusion model, according to the embodiments of the disclosure.

FIG. 2 is an architecture 200 illustrating generation of transition effects through the utilization of a flow-guided video diffusion model 205, according to the embodiments of the disclosure.

The architecture 200 includes a feature extractor 201, a transition index detector 202, a dynamic prompt generator 203, a transition component identification unit (identifier) 204, the flow guided video diffusion model 205, a pixel-wise frame motion estimator 206 and one or more loss functions unit (loss functions circuit) 207.

The plurality of image frames or video frames may be provided as an input to the feature extractor 201.

The feature extractor 201 may receive the video frames or the image frames, which possess dimensions (e.g., height, width, and channels). The feature extractor 201 may output the F dimensional features for T frames. The feature extractor 201 may extract the T×F dimensional features from the frames for purposes such as image recognition purposes, object detection purposes, and computer vision applications. Prior to the feature extraction from the video clips, pre-processing techniques such as resizing techniques, noise reduction techniques, and colour normalization techniques may be implemented for the video clips. In addition, the feature extractor 201 may identify the number of objects in the video frames. The objects may include, but are not limited to, people, trees, vehicles, events, and landscapes. An output from the feature extractor 201 may be provided as an input to the transition index detector 202. The transition index detector 202 may assess the similarities between the frames to identify the inter/intra video transition boundaries. The intra video transition boundaries are the boundaries present in the single video. The inter video transition boundaries may be the boundaries present between the plurality of videos when the plurality of videos are combined.

The output from the feature extractor 201 may be provided as an input to the dynamic prompt generator 203. By using the dynamic prompt generator 203, the dynamic prompts may be generated by analyzing the features of the input video frames. For example, the prompts generation may consider properties like emotion parameters 307 associated with the output from the feature extractor 201, description associated with the output from the feature extractor 201, class associated with the output from the feature extractor 201, audio transcripts 405 associated with the input video, or explicit text prompts received from the user input. In an embodiment, the dynamic prompts may be adjusted based on user's input to allow and provide more personalized and contextually relevant interaction.

The transition index detector 202 may identify the transition boundary frame indices. The transition index may insert the masked frames.

The dynamic prompt generator 203 may give prompts as conditional vectors. The masked frames and the conditional vectors from dynamic prompts may be transmitted to the flow guided video diffusion model 205. The flow guided video diffusion model 205 may consist of transition component identification unit 204 and the pixel-wise frame motion estimator 206. The flow guided video diffusion model 205 may be trained using the one or more loss functions unit 207.

The flow guided video diffusion model 205 may utilize the output of transition component identification unit 204 for self-conditioning. The optical flow calculated using the pixel-wise frame motion estimator 206 may guide the diffusion model to generate the transitions. The loss functions unit 207 may help the diffusion model converge during training to generate the transition effects maintaining the transition properties, for example, like components, uniformity, style, creativity. Further, the transition components identification unit 204 may determine the transition components in the frames to be used for the transitions in the video frames. The components may be objects present in the videos.

The video diffusion model 205 may involve a flow-guided forward diffusion process, also known as deterministic process and a reverse diffusion process, also known as a learnable process. The input video data can be given by equation (1):

$$X_0 \in R^{T \times H \times W \times C} \quad (1)$$

T represents the temporal dimension, indicating the number of frames in the video. H represents the height (number of rows) of each frame. W represents the width (number of columns) of each frame. C represents the number of channels (e.g., 1 for grayscale videos, 3 for RGB color videos) of each frame.

The forward diffusion process is a deterministic process that progressively adds Gaussian noise sampled from $q(X_t|X_{t-1})$ to the input $X_{t-1}$ at time step t, where $\beta_t$ is the noise scheduler designed such that $\beta_T \to 1$ and $q(X_T|X_0) \approx N(X_T; 0, I)$. T is the total number of diffusion steps. Then, the forward diffusion process or the deterministic process may correspond to a Gaussian process which satisfies the Markovian Assumption and is determined as shown below in equations 2, 3, and 4:

$$q(X_t | X_{t-1}) = N(X_t; \sqrt{1-\beta_t} X_{t-1}, \beta_t I) \quad (2)$$

$$q(X_{1:T} | X_0) = \prod_{t=1}^{T} q(X_t | X_{t-1}) \text{ Define } \overline{\alpha}_t = \prod_{s=1}^{T} (1-\beta_s), \quad (3)$$

$$q(X_t | X_0) = N(X_t; \sqrt{\overline{\alpha}_t} X_0, (1-\overline{\alpha}_t)I) \quad (4)$$

$\beta_t$ values schedule is designed such that $\overline{\alpha}_T \to 0$ and $q(X_T|X_0) \approx N(0, I)$.

The reverse diffusion process aims to estimate the time reversal function $q(X_{t-1}|X_t)$ using a model $p_\theta(X_{t-1}|X_t)$ whose parameters are learned by a neural network by maximizing the evidence lower bound. The reverse diffusion process or the learning process is a process for learning to reverse the forward diffusion process for generation of the personalized content and may be determined as follows as shown below in equations 5 and 6:

$$p_\theta(X_{0:T} \mid c) = p(X_T) \prod_{t=1}^{T} p_\theta(X_{t-1} \mid X_t, c) \quad c = \{\text{conditional vectors}\} \quad (5)$$

$$p_\theta(X_{t-1} \mid X_t, c) = N(X_{t-1}; \mu_\theta(X_t, t, c), \Sigma_\theta(X_t, t, c)) \quad (6)$$

Here, the finite reversal function is Gaussian with $\mu_\theta$ and $\Sigma_\theta$ as parameters, and $\mu_\theta$ is estimated using the UNet-3D architecture, and conditional vectors may include at least one of the audio transcript of the video, the class of the video, the user emotion of the video, the video description of the video and the user input of the video.

In an embodiment, the pixel-wise frame motion estimator 206 may determine the motion in the individual pixels between consecutive frames of the video sequence. The pixel-wise motion estimation may be achieved using various techniques, such as block matching technique, optical flow methods, or deep learning-based approaches.

The loss functions unit 207 are determined based on the equations below:

Loss functions=Diffusion Loss+sampled softmax (SSM) Contrastive Loss+Transition Loss+Motion Loss The diffusion loss can be determined with a cumulative formula as shown below in equation 7:

$$\text{Diffusion Loss} = L_\theta(X_0 \mid c) = Eq \; [L_T(X_0) + \quad (7)$$
$$\Sigma_{t>1} \; D_{KL} \; (q(X_{t-1} \mid X_t, X_0) \| p_\theta(X_{t-1} \mid X_t, c)) - \log \; p_\theta(X_0 \mid X_1, c)]$$

Total loss is given as:

Diffusion Loss+SSM Contrastive Loss+Transition Loss+Motion Loss $$\text{SSM Contrastive Loss} = \left(\frac{1}{m}\right)\sum_{k=0}^{m} \alpha N^k - \left(\frac{1}{m}\right)\sum_{k=0}^{m} P^k$$

Where, $P^k$ (+) and $N^k$ (−) denote a $k^{th}$ positive/negative sample respectively a is weighting factor <<1.

The contrastive loss pull together similar features and pushes apart dis-similar features in embedding space. This loss brings the distinct features at transition closer and making transition smooth. The diffusion model is constrained to generate transition frames that emit spatial similarity.

$$\text{Transition Loss} = L_1(x) = \alpha L_{content} + \beta L_{style},$$

$$L_{content} = \left(\frac{1}{2}\right)\Sigma_{i,j}(F_{ij}^l - P_{ij}^l)^2 \text{ and } L_{style} = \Sigma_{l=0} \; w_l E_l$$

Here, $F_{ij}^1$ and $P_{ij}^1$ are feature representation in layer 1 for generated and original transition, $w_i$ are weighting factors of the contribution of each layer to the total loss.

$$E_l = \left(\frac{1}{4N_l^2 M_l^2}\right)\sum_{i,j}(G_{ij}^l - A_{ij}^l)^2$$

Here, $G^1$ and $A^1$ are style representations in layer 1 for generated and original frame.

Content may include the frame at the end of the first video at transition index. Style may include the frame at the first frame of second video at transition index.

$$\text{Motion Loss} = L_{flow} = \sum_x |w(x) - wGT \; (x)|_2$$

Here, $|\cdot|_2$ computes the L2 norm of a difference between ground truth optical flow and predicted optical flow. The optical flow estimation can guide the diffusion model to generate smooth and seamless transitions and effects. The optical flow estimation generates more natural and content specific transitions and handle fast and subtle motions.

The pixel-wise frame motion estimation may be performed by using a spatio-temporal convolution neural network. The spatio-temporal convolution neural network may extract the pixel motions between the frames. The pixel motion may refer as the motion of pixel. The pixel-wise frame motion estimation may guide the flow guided video diffusion model 205 to generate smooth and content specific natural transitions and effects. The pixel-wise frame motion estimation may estimate the motion of pixel between frames of the first event, masked frames and the second event. The loss function occurred during the pixel-wise motion estimation may be back-propagated to the flow guided video diffusion model 205 by combining with the diffusion loss. For example, the pixel-wise motion estimation information may be extracted using convolution layers such as FlowNet. The FlowNet is a deep learning architecture designed for optical flow estimation in images. The optical flow estimation may refer to the apparent motion of the objects in a visual scene as observed by the user. The FlowNet may determine the motion of objects within the videos or sequence of images.

The flow guided video diffusion model 205 may receive the input from the operations of the transition components identification obtained using the transition components identification unit 204, the pixel-wise frame motion obtained using pixel-wise frame motion estimator 206, and the loss functions obtained using the loss functions unit 207. The flow guidance may induce the contextual transition effect in the video clips. The flow guided video diffusion model 205 utilizes the output of the transition component identification unit 204 for self-conditioning. The optical flow calculated using the pixel-wise frame motion estimator 206 may guide the diffusion model to generate the transitions. The loss functions unit 207 may help the diffusion model converge during training to generate the transition effects maintaining the transition properties, for example, like components, uniformity, style, creativity. The transition component identification unit 204 may be a self-conditioning block for the flow guided video diffusion model 205. This is accomplished by identifying the key components (important subject, object or event) from frames to include in transition effect using the self-conditioning with non-causal Spatio-Temporal Attention, beyond the second event. The self-conditioning is a determination process that allows the model to focus on specific parts of the input image frames in spatial and temporal domain. A non-causality allows to consider next event frames.

In an embodiment, the plurality of frames are received for the videos. The degree of similarity between the plurality of frames are determined. Further, the occurrence of change from the first event and the second event of the videos are determined. Further, the transitional boundaries are determined between the first event and the second event. Thereafter, the location in the frames is marked as the 'masked frames' based on the transitional boundaries. Further, the number of masked frames (e.g., 317 shown in FIG. 3) are inserted at the location between the frames of the first event and the second event. Further, the transition components are determined in the first event and the second event of the videos. The motion of pixels for the transition components are determined across the frames of the first event and the second event.

The creation of the contextual transition effects may occur within the masked frames 317 that bridge the gap between the first and second events. This is accomplished by utilizing the motion pixels of the transition components. The transition components may include the plurality of events beyond the second event. The motion of pixels within the masked frames 317 may be updated in synchronicity with the determined motion of pixels in the transition components. These transition components may include at least one of the objects within frames, the object of attention within the frames, additional video parameters, the audio transcripts 405, the user emotion parameters 307, the description parameters of the frames, the class parameters of the frames, and the auxiliary prompts 306 within the frames. It is important to note that the masked frames 317 may include noise.

Based on their respective locations, the transition effects to the frames of the first events and the second events results in the creation of a smooth, transitional videos. These videos may include the transition effects applied between the frames of the two events and can be stored for future use.

In an embodiment, the pixel-wise frame motion is estimated. The pixel-wise frame motion estimation includes a spatio-temporal convolution neural network (e.g., FlowNet) that extracts the pixel motions between the frames. The loss occurred during the pixel-wise motion estimation may be back-propagated to the video diffusion model by combining the weighted sum with the diffusion loss.

Figure 3:
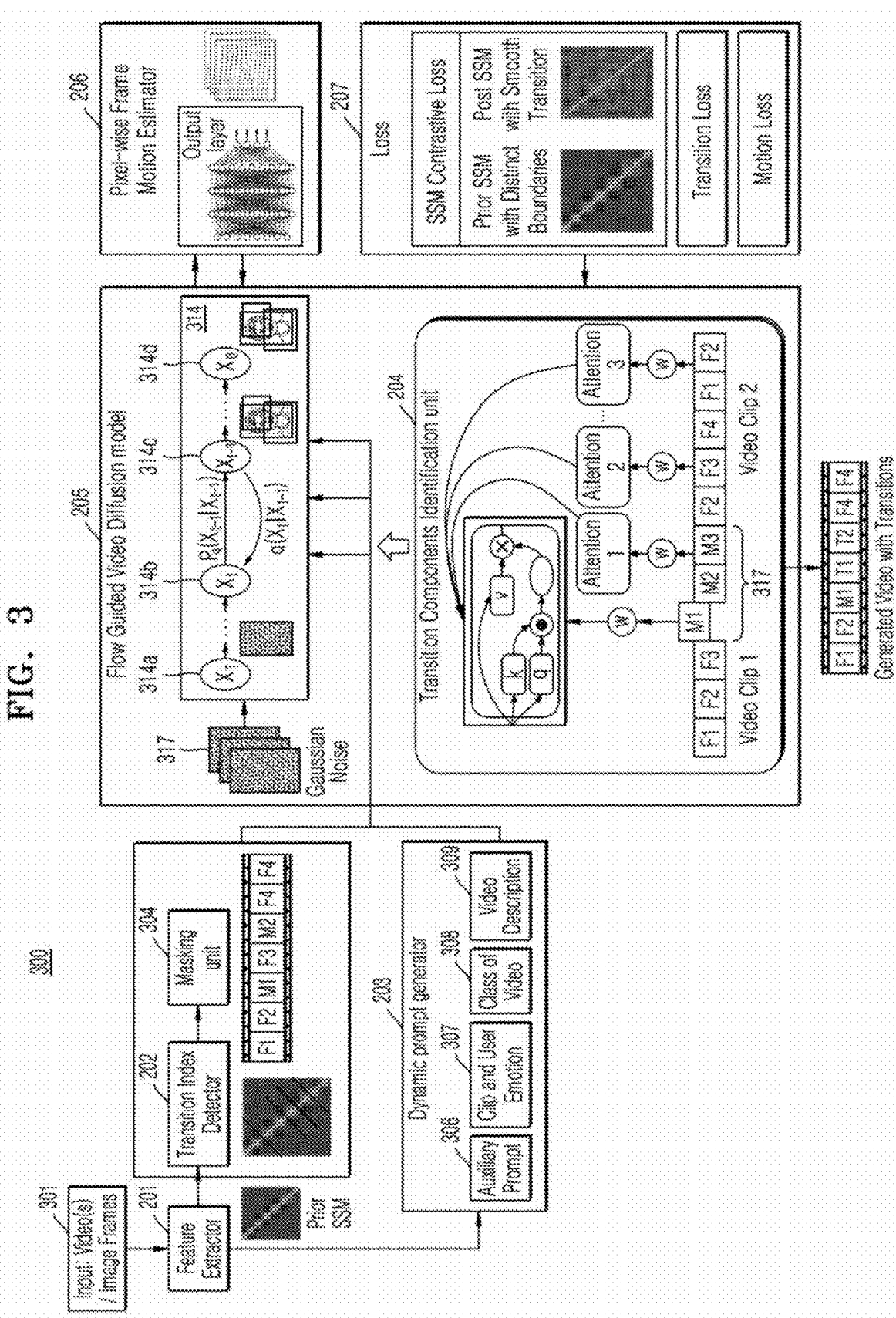
FIG. 3 is an architecture representation of the flow guided video diffusion model that facilitates inference via pixel-wise frame motion generation, according to the embodiments of the disclosure.

FIG. 3 is an architecture 300 representation of the flow guided video diffusion model that facilitate inference via pixel-wise frame motion generation, according to the embodiments of the disclosure.

The feature extractor 201 may receive the plurality of image frames 301 as input and perform the feature extraction process for the plurality of image frames. This feature extraction process serves for various purposes, such as image recognition process, object detection process, and computer vision applications. Prior to the extraction of features from the video clips, the pre-processing phase may be carried out. The pre-processing phase may involve at least one of resizing process, noise reduction process, and color normalization process, for example. Ultimately, the feature extractor 201 may be capable of identifying the number of objects present within the input video frames.

The transition index detector 202 may identify inter/intra video transition boundaries using similarity between the frames using the transition index. These transition boundaries may be marked as transition indexes. The transition index may be detected and the indexed places may be marked in the frames.

The masking unit (masking circuit) 304 may insert the masked frames between the plurality of frames or video clips based on the marked frames.

By using the dynamic prompt generator 203, the dynamic prompts are generated. The dynamic prompt generation may include auxiliary prompt 306 of the videos, the clip of the videos, the user emotion parameters 307 of the videos, class of video 308 of the videos, and video description 309 of the videos. The dynamic prompts are determined based on at least one of the audio of the video clip, the visual of the video clip, the emotion parameters 307 of the users in the video clip, and the like. The audio received from the video clip may be converted as the audio transcripts 405 and the description may be generated based on the audio. In an embodiment, the auxiliary prompts 306 may serve to enhance the effectiveness and clarity of prompts, making it easier for the users to provide the desired information or response.

The flow-guided video diffusion model 205 may receive the output received respectively from the transition index detector 202 and the dynamic prompt generator 203. Further, the output may be used as conditional vectors for the flow guided video diffusion model. In the flow-guided video diffusion model 205, the transition components may be identified by examining the attention levels (attention 1, attention 2, . . . , attention n) of each frame. The attention level can be referred as 'object of interest.' The attention scores may be computed for each frame. The attention score may define the importance of the identified transition components. Additionally, the transition components may be determined by factoring the output of the loss function 207. The loss function is already explained in FIG. 2. Moreover, the masked frames comprise the Gaussian noise. The masked frames start with Gaussian noise and are de-noised via the diffusion model. The Gaussian noise may refer to the values of pixels follow a Gaussian distribution. The total loss functions unit 207 may comprise of four losses e.g., diffusion loss, motion loss, SSM contrastive loss and transition loss (explained in FIG. 2). The total loss is sum of all losses. The purpose of loss is to direct the de-noising process via diffusion in correct direction. The FIG. 3 demonstrate the prior SSM with distinct boundaries and post SSM with smooth transitions, which are further explained in FIG. 10.

Figure 4:
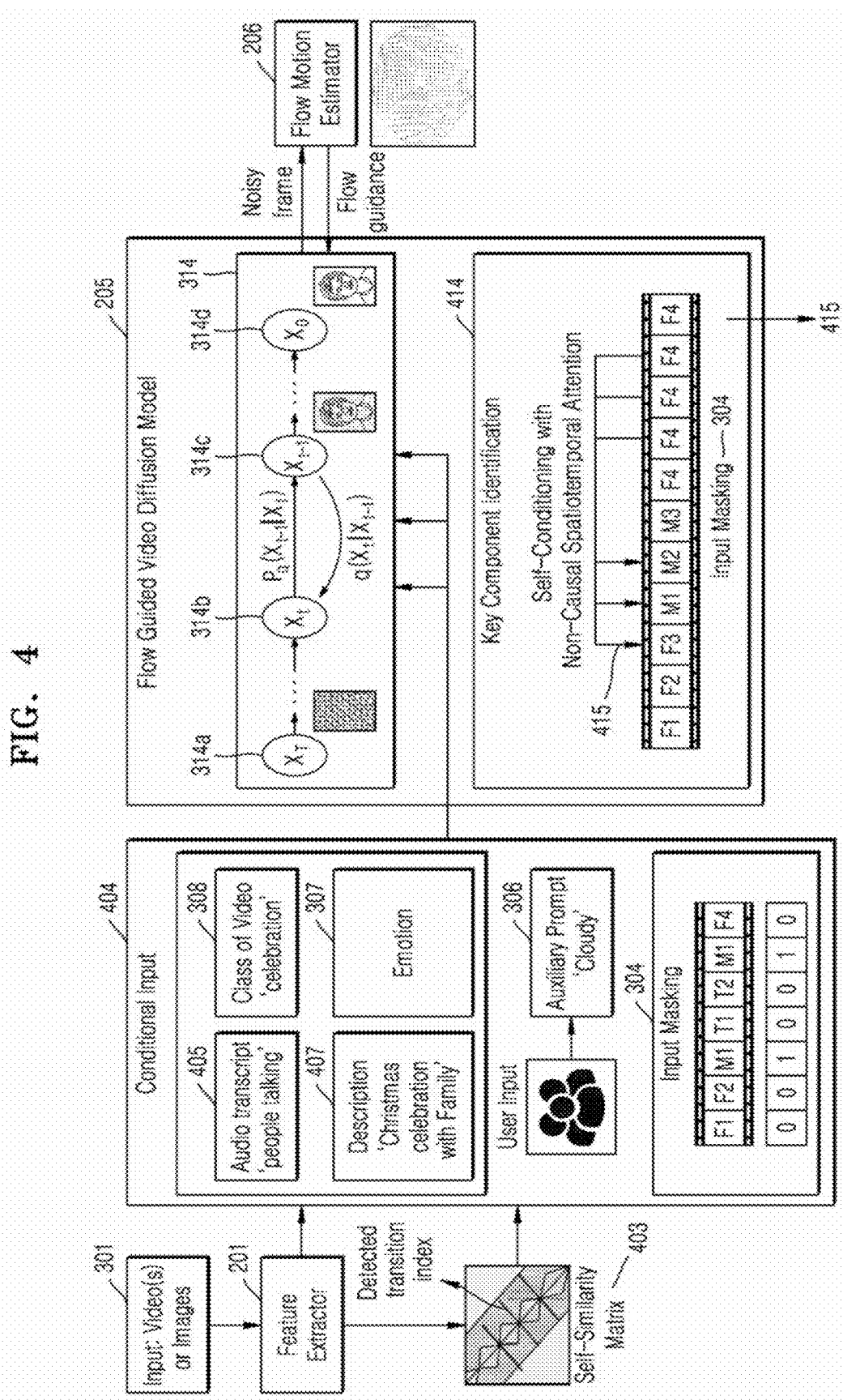
FIG. 4 is a block diagram that illustrates generation of the transition effects in the videos based on flow guided video diffusion model and a self-conditioning technique, according to the embodiments of the disclosure.

FIG. 4 is a block diagram that illustrates generation of the contextual transition effects in the videos based on the flow guided video diffusion model and the self-conditioning, according to the embodiments of the disclosure.

The feature extractor 201 may receive the input from the set of image frames 301, 1210. These image frames can also be referred to as media frames or video clips within the specification. The image frames themselves can include a collection of video clips, depicting either a single event or a series of events.

The feature extraction 201 is used for various purposes such as image recognition purpose, object detection purpose and computer vision applications, for example. The pre-processing may be performed before extracting the features from the video clips. The pre-processing may include at least one of resizing process, noise reduction process and colour normalization process, for example. The feature extractor 201 may identify the number of objects in the image frames.

The similarity matrix 403 may be determined for the extracted features of the image frames 301, 1210. The location of the transition index, denoting where the event change has occurred in the frames 301, 1210, may be then determined and marked based on the event change itself. This index may serve as a reference point for the specific event change. Examples of such change of the event includes, but not limited to, the user transitioning from a birthday party to playing a game, or a shift in scenery from trees to mountains or the like. The extracted features and the indexed frames may be subsequently subjected to further processing.

The extracted features of the image frames 301, 1210 information may be extracted from the image frames 301, 1210 including at least one of the audio data of the video clip, the video class 308 of the video clip, the description of the video clip, the emotion parameters 307 of the users in the video clips, and other relevant details of the video clip.

The audio transcripts 405 can include the user's speech or music in the background, amongst other audio elements. The video class 308 may pertain to the type of video being presented, such as a celebration, gaming, sports, and so forth. The description of the video clip may dig deeper into the video class 308, may provide further details about the event, for example, a Christmas celebration with family or a user playing football.

Emotion parameters 307 of the user in the videos, such as happiness, sadness, joy, and the like, may be also captured and can be input by the user into the electronic device 1500 (e.g., user device or the like).

The dynamic prompts are generated by analyzing the media frames of the input videos. The dynamic prompts are tailored to the user's emotion parameters 307, the video class 308, the audio transcripts 405, the explicit text prompts, and other relevant factors.

The flow guided video diffusion model 205 may be used for updating the pixel values of the masked frames 317 in synchronization with the estimated pixel motion and transition components to create the transition effects. For self-conditioning the video clip, the plurality of attentions in the videos may be determined. The attention can be referred as 'object of interest.'

Further, the pixel-wise frame motion may be estimated. The technique of the pixel-wise frame motion estimation may find its application in various domains such as video compression, object tracking, and video processing. The pixel-wise frame motion estimation technique pertains to the calculation of motion for individual pixels of the video sequence between two consecutive frames. The pixel-wise frame motion estimation may include the spatio-temporal convolution neural network (e.g., FlowNet) that extracts the pixel motions between two frames. The forward propagation may estimate the motion of pixels from the current frame to the subsequent frame 702 (explained in FIG. 7)), and the features such as corners, edges or complex descriptors may be extracted from the current frames of the image frames (301 and 1210). The function loss occurred during the pixel-wise motion estimation may be back-propagated to the video diffusion model by combining (e.g., weighted sum) with the diffusion loss. The creation of the contextual transition effects may occur within the masked frames 317 that bridge the gap between the first and second events. This is accomplished by identifying the key components (e.g., important subject, object or event) from frames to include in transition effect using the self-conditioning with attention, which includes the plurality of components (e.g., important subject, object or event) beyond the second event. Further, the masked frames may be denoised using diffusion model in synchronicity with the determined transition component. The frames may be present frames, the frames of the next video clip, future frames, the image frames 301, 1210 of previous video clip, or past frames, among others. Further, the motion vector may be determined to reflect the change in the motion of the frames.

Figure 5:
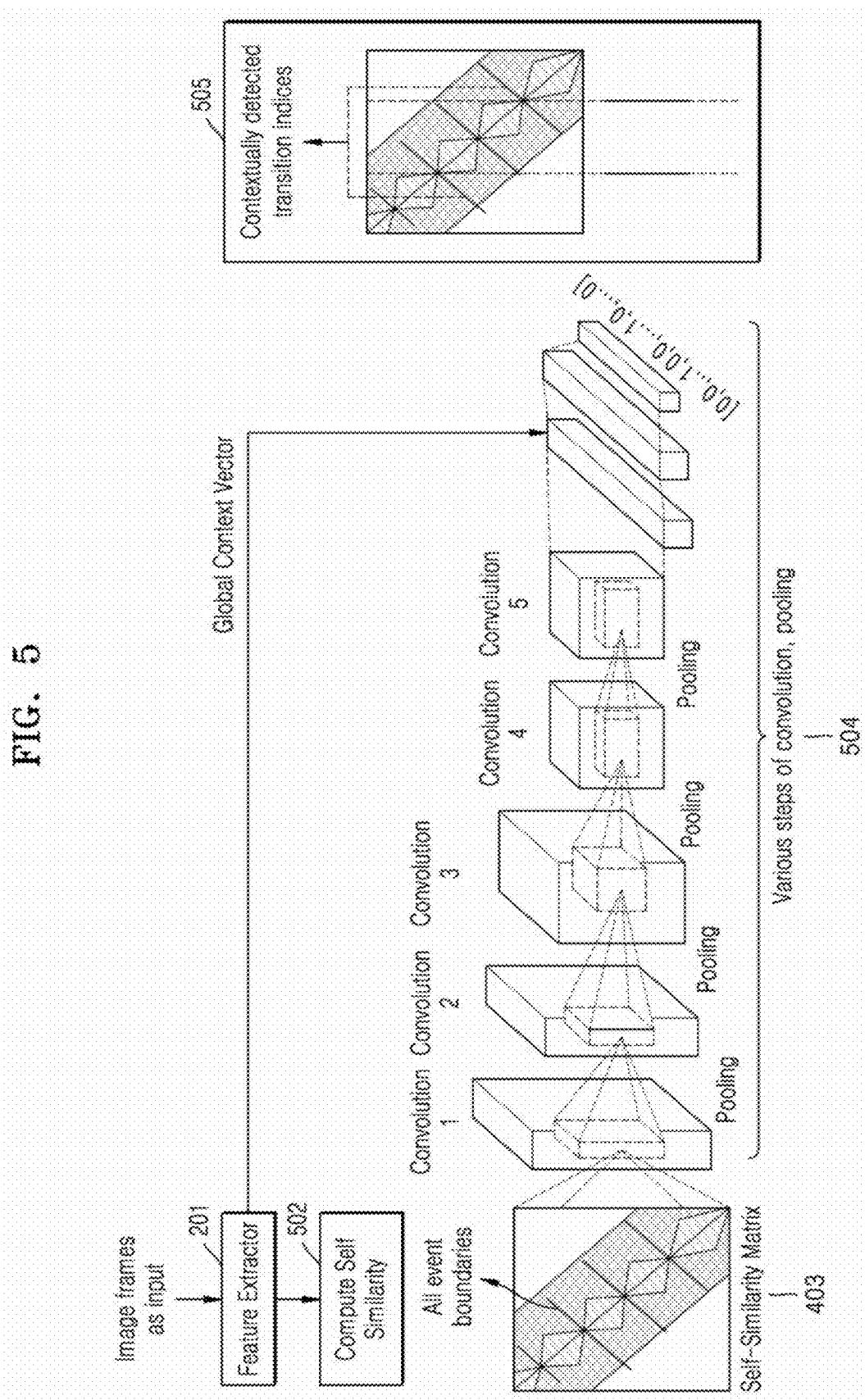
FIG. 5 is a block diagram that illustrates contextual transition index detection model that yield contextual transition effects in the videos, according to the embodiments of the disclosure.

FIG. 5 is a block diagram that illustrates the contextual transition index detection model that yields the contextual transition effect in the video, according to the embodiments of the disclosure.

The feature extraction may be used for various purposes. The feature extractor 201 may identify number of objects in video frames given as an input.

The self-similarity is computed from the features of frames 301, 1210, which serves as a means of identifying video transition boundaries based on the similarity between the frames or video clips. Once the boundaries or event change locations are identified, the contextual transition index may be then determined.

The similarity matrix 403 may be determined for the extracted features of the image frames 301, 1210. The transition index may represent the location where the change in the event occurs in the image frames 301, 1210, may be identified and marked based on the event alteration. The event alteration can refer to the variety of changes in the image frames of the video, such as the user being at a birthday party, playing a game, or observing a scene with trees and mountains, for example. Subsequently, the extracted features and indexed frames may be subjected to further processing. The contextually detected transition indices may be determined from the self-similarity matrix using the Convolution and pooling functions.

The convolution and pooling functions are integral functions in the image processing and computer vision, particularly concerning convolutional neural networks (CNNs), which are extensively applied for tasks such as image classification process, object detection process, and segmentation process. In image processing process, the convolution process often employs a diminutive matrix labeled a kernel or filter. This kernel sweeps over the entire image and, performs a mathematical operation at each position. Convolution operates in four primary steps: First. Kernel: The kernel is a small matrix of numbers. Each element in the kernel represents a weight. Second. Overlaying: The kernel is placed over a portion of the image. The center of the kernel aligns with a pixel in the image. Third. Element-wise Multiplication and Summation: The values in the kernel are multiplied element-wise with the corresponding pixel values in the image. The results are then summed. Fourth. Result in New Image: The sum is placed in a new image at the corresponding position where the center of the kernel aligned with the original image.

The convolution and pooling functions may be iteratively executed for each pixel in the image, so as to result in the creation of the transformed version of the original image. The nature of the transformation may be contingent upon the values present in the kernel. Various types of kernels can be employed to carry out a range of tasks such as edge detection process, blurring process, sharpening process, and more. For instance, the commonly used operation is known as "Gaussian blur" which facilitates noise reduction and detail reduction in the image frames 301, 1210. This noise reduction is accomplished by means of convolution with the Gaussian kernel. The convolution process performs the myriad of image processing tasks, including feature extraction process, edge detection process, and image enhancement process, for example. Pooling is a down sampling operation that curtails the spatial dimensions of an image, while preserving valuable features. A small window (typically, 2×2 or 3×3) may be defined and made to slide over the image. At each position, the maximum (max pooling) or average (average pooling) value in the window may be selected and placed into a new, smaller image. Employing pooling may aid in reducing computational complexity and memory requirements, by decreasing the size of the data. Additionally, it may facilitate the formation of a hierarchical representation of features. The convolution pooling process transpires in the plurality of stages, as a means of determining contextually based transition indices 505.

Figure 6:
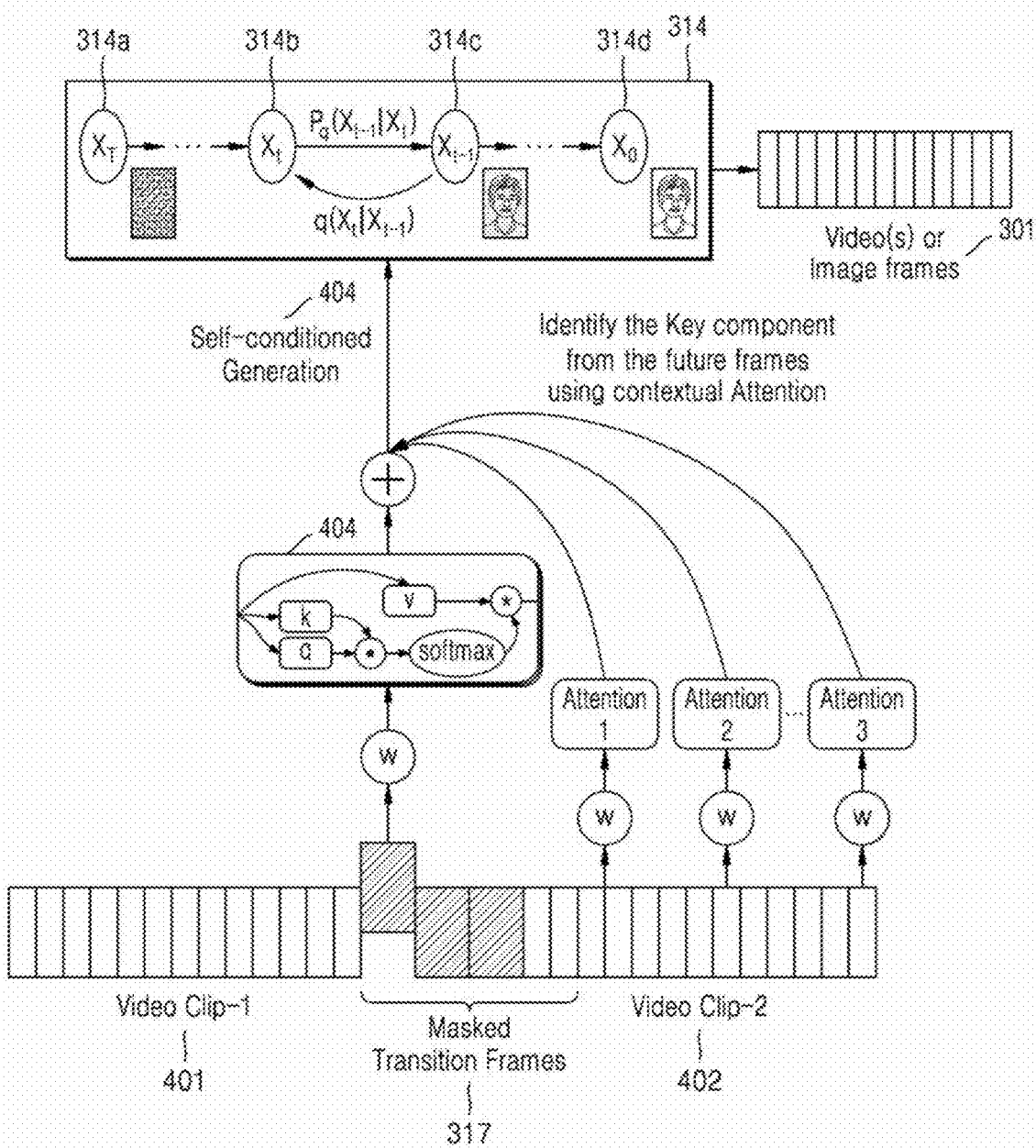
FIG. 6 is a block diagram that illustrates a method for identification of transition components in the videos, according to the embodiments of the disclosure.

FIG. 6 is a block diagram that illustrates the method for identification of the transition components in the video or the plurality of videos, according to the embodiments of the disclosure.

Referring to FIG. 6, the video clips 401, 402 with the masked frames 317 are given as the input to the self-conditioned generator to generate the self-conditioned frames. The video clips 401, 402 from the future, in addition to the past and present video clips 401, 402, are used for self-conditioning with non-causal Spatio-temporal attention. The Spatio-temporal attention may indicate a consideration of both spatial (related to space or location) and temporal (related to time) dimensions that is analyzing data across both space (pixels in an image) and time (frames in a video sequence). The attention determination process may allow the model to focus on specific parts of the input image frames 401, 402. The determined attentions (e.g., attention 1, attention 2, attention 3) may be given as input to the self-conditioned generation 404. This is particularly useful in tasks where certain parts of the input are more relevant than others. The attentions are represented as, for example, attention 1, attention 2, and attention 3 in the FIG. 6. The key components may be determined based on the attentions received from the image frames 401, 402. The key components may be interchangeably referred as transition components in the specification. The key components can include the objects, the object of attention, the additional parameters, the audio transcripts 405, the emotion parameters 307 of the user, the description parameters and non-casual spatiotemporal attention of the plurality of image frames 401, 402, the class parameters, and the auxiliary prompt 306 of the image frames 401, 402.

Figure 7:
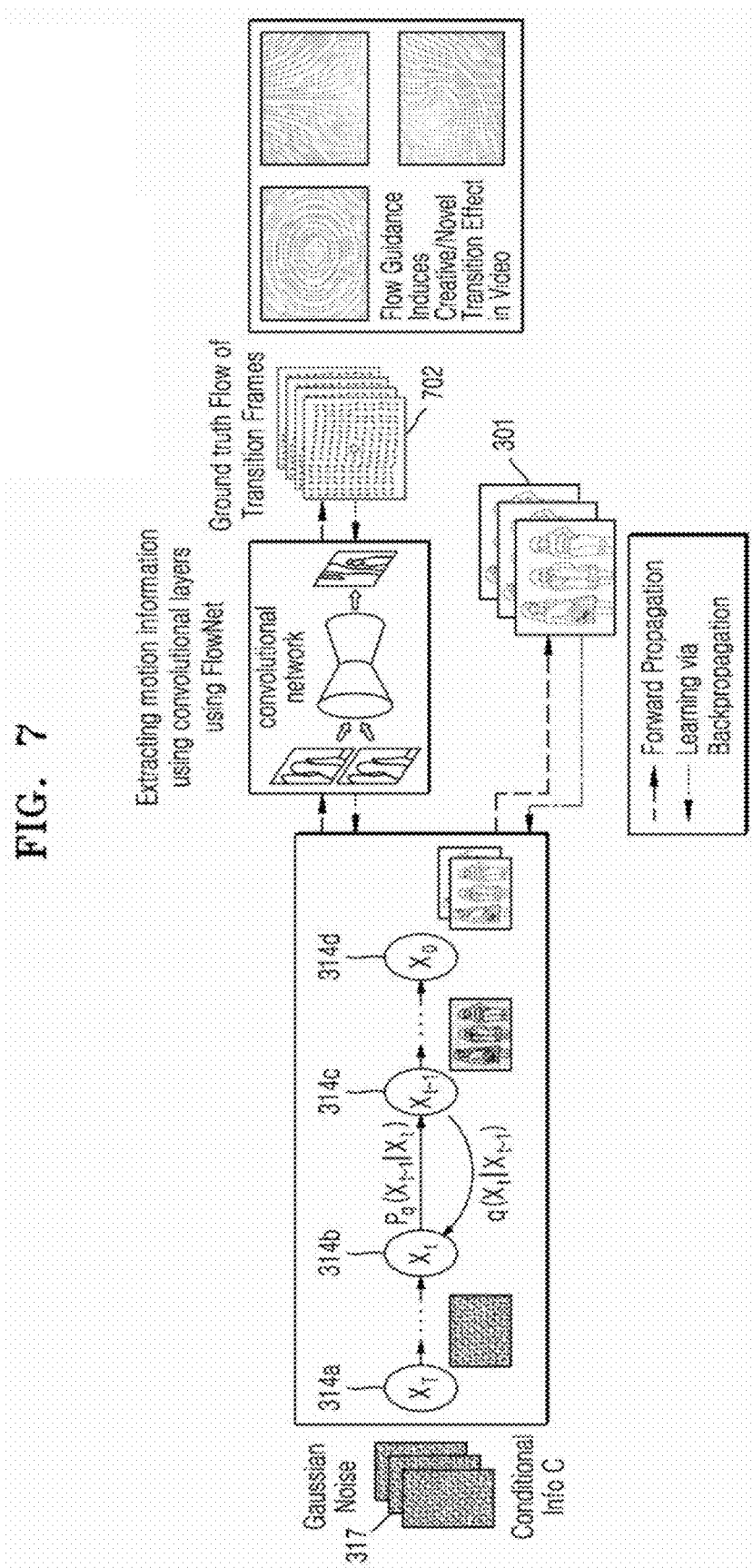
FIG. 7 is a block diagram that illustrates a pixel-wise frame motion estimation approach for generating the contextual transition effects in the videos, according to the embodiments of the disclosure.

FIG. 7 is a block diagram that illustrates pixel-wise frame motion estimation approach for generating the contextual transition effects in the videos, according to the embodiments of the disclosure.

The pixel-wise frame motion estimation is estimated. The pixel-wise frame motion estimation is performed by the spatio-temporal convolution neural network (for instance, FlowNet). The spatio-temporal convolution neural network may extract the pixel motions between the frames. The function loss occurred during the pixel-wise motion estimation may be back-propagated to the video diffusion model by combining the weighted sum with the diffusion loss. The creation of the contextual transition effects may occur within the masked frames 317 that bridge the gap between the first event and the second event. This is accomplished by identifying the key components (e.g., subjects, objects or events) from the frames to include in transition effect using self-conditioning with attention, which includes the plurality of components beyond the second event. Further, the masked frames may be denoised using the diffusion model in synchronicity with the determined transition component. The frame motion estimation may involve estimating the motion of each pixel in the video sequence between consecutive frames. The forward and backward propagations may be used to refine the motion estimation. The forward propagation may involve estimating the motion of pixels from the current frame to the next frame in the sequence 702. Moreover, after every forward pass, the frame motion estimation may be done for the denoised frames. Further, the loss may be calculated between ground truth pixel motion and generated frame pixel motion based on the loss and the backpropagation may be done. The features are extracted from the current frames of the image frames 301, 1210. The features can be corners, edges or complex descriptors and the like. The features extracted are matched with the other frames to determine the normalized correlation. The other frames can be present frames, frames of the next video clip or future frames, the image frames 301, 1210 of previous video clip or past frames and the like. The motion vector is determined for change in the motion of the frames.

The pixel-wise frame motion estimation is described herein:

$$p_\theta(x_{0:T}|y) = p_\theta(x_T) \prod_{t=1}^{T} p_\theta(x_{t-1}|x_t, f)$$

here, f is the optical flow predicted $$\nabla_{x_t} \log p_\theta(x_t|f) = \nabla_{x_t} \log\left(\frac{p_\theta(f|x_t) p_\theta(x_t)}{p_\theta(f)}\right)$$

$p_\theta(x_{t-1}|x_t, f)$ is the denoised transition frame guided by the estimated optical flow $$= \nabla_{x_t} \log\ p_\theta(x_t) + \nabla_{x_t}\ \log(p_\theta(f|x_t))\ \text{Bayers rule}$$

$$\nabla \log p_\theta(x_t|f) = \nabla\ \log p_\theta(x_t) + s \cdot \nabla\ \log(p_\theta(f|x_t))$$

Loss back-propagated is the weighted sum of original diffusion gradients and motion prediction gradients (guidance).

Figure 8:
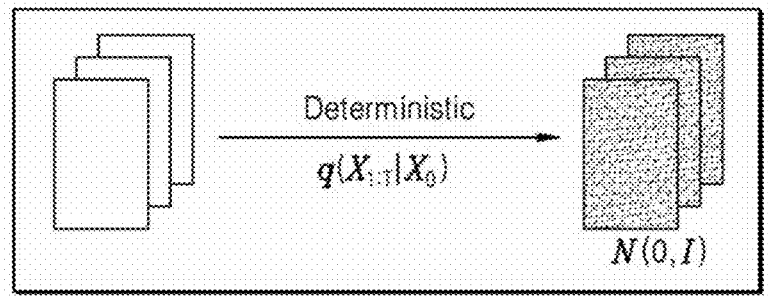
FIG. 8 is a block diagram that illustrates methodology for training forward propagation model to generate the contextual transition effects in the videos, according to the embodiments of the disclosure.

FIG. 8 is a block diagram that illustrates training forward propagation model to generate the contextual transition effects in videos, according to the embodiments of the disclosure. The input of image frames 301, 1210 is given to perform the forward propagation (explained in FIG. 1).

$$X_0 \in R^{T \times H \times W \times C} \qquad \text{Eq (1)}$$

Here, $X_0$ is input video of dimension T×H×W×C of real number R, where T=frames count, H=height, W=width, C=channels.

Where Forward Process:

$$q(X_t|X_{t-1}) = N\left(X_t; \sqrt{1-\beta_t}\, X_{t-1}, \beta_t I\right) \qquad \text{Eq (2)}$$

$$q(Z_{1:T}|X_0) = \prod_{t=1}^{T} q(X_t|X_{t-1}),\ \text{Define}\ \overline{\alpha_t} = \prod_{s=1}^{T}(1-\beta_s),$$

$$q(Xt|X0) = N\left(Xt;\ \sqrt{\overline{\alpha_t}}\, X_0,\ (1-\overline{\alpha_t})I\right) \qquad \text{Eq (3)}$$

$\beta_t$ values schedule is designed such that $\overline{\alpha}_T \to 0$ and $q(X_T|X_0) \approx N(0, I)$ In an embodiment, the diffusion model may involve the forward (deterministic) and the reverse (learnable) process. In the forward process, the given input (typically, an incomplete or noisy image) may be used to generate the series of increasingly refined samples over the sequence of steps. In the deterministic process, the output generated may be same every time for the given input. The deterministic transformation may be applied iteratively, so as to gradually improve the quality of the generated samples.

Figure 9:
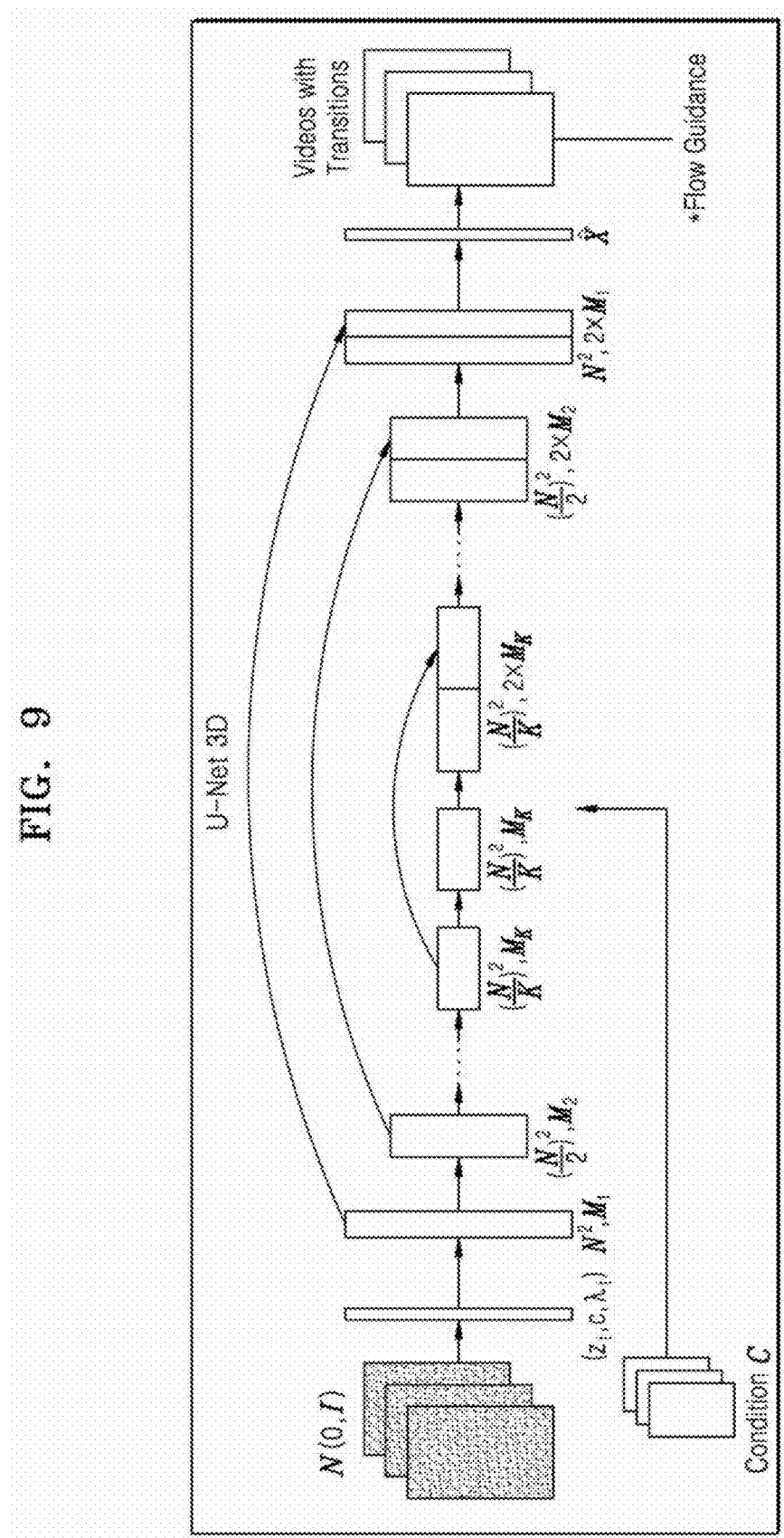
FIG. 9 shows a block diagram that illustrates reverse propagation model training for generating the contextual transition effects in the videos, according to the embodiments of the disclosure.

FIG. 9 shows a block diagram that illustrates the reverse propagation model training for generating the contextual transition effects in the videos, according to the embodiments of the disclosure.

The reverse propagation model approximates the inverse of the forward process. The reverse propagation model is stochastic and learned from data. The reverse propagation model maps refined or learned samples of the image frames 301, 1210 to the original input distribution. By iteratively "moving backwards" through the sequence of generated samples, the reverse propagation model attempts to recreate the original input, effectively "undoing" the forward process.

Reverse Process:

$$p_\theta(X_{0:T}|c) = p(X_T) \prod_{t=1}^{T} p_\theta(X_{t-1}|X_t, c); c = \{\text{conditional vectors}\} \quad \text{Eq (4)}$$

$$p_\theta(X_{t-1}|X_t, c) = N(X_{t-1}; \mu\theta(Xt, t, c), \Sigma\theta(Xt, t, c)) \quad \text{Eq (5)}$$

Finite Reversal function is Gaussian with $\mu_\theta$ and $\Sigma_\theta$ as parameters $\mu_\theta$ is estimated using the UNet-3D architecture.

Diffusion Loss = $L_\theta(X_0|c) =$ $Eq\ [L_T(X_0) + \Sigma_{t>1}\ D_{KL}\ (q(X_{t-1}|X_t, X_0)||p_\theta(X_{t-1}|X_t, c)) - \log\ p_\theta(X_0|X_1, c)]$ The total loss is the sum of all four losses e.g., Diffusion Loss+SSM Contrastive Loss+Transition Loss+Motion Loss.

Total Loss = Diffusion Loss + $\quad$ Eq. (7)

SSM Contrastive Loss + Transition Loss + Motion Loss

The Diffusion loss compute the loss with respect to the at least one of the frames that were corrupted with noise. The SSM Contrastive Loss ensures that transition effect between the at least one frames of the first event and the at least one frames of the second event is visually appropriate and uniform at the location of transition. The Transition Loss brings the style parameters of at least one frame of the at least one event of at least one video into at least one frame of the second event for effective and accurate transition. The Motion Loss generates creative and new transition effect in the one or more masked frames between the first event and the second event that is adaptive to the transition parameter, based on the motion of pixels.

Figure 10:
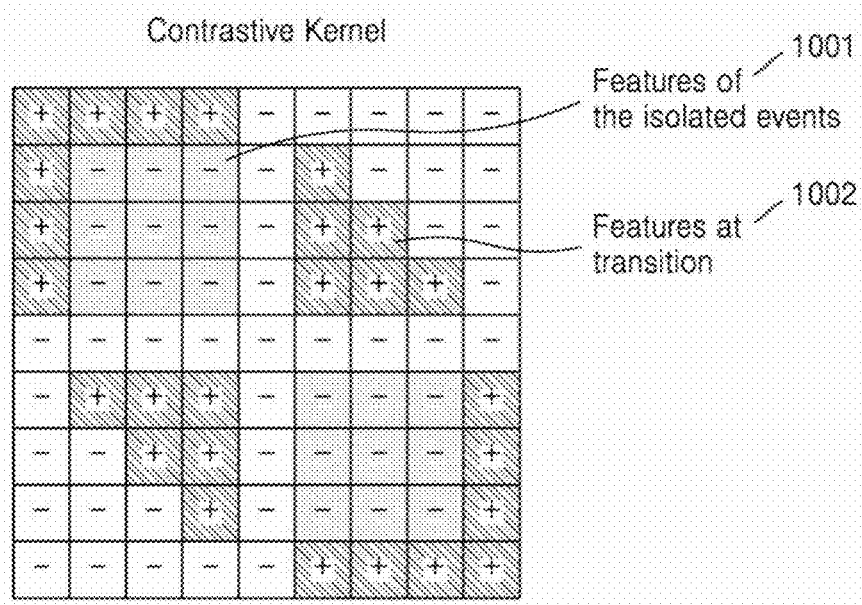
FIG. 10 is a schematic that illustrates loss functions of the transition videos, according to the embodiments of the disclosure.

FIG. 10 illustrates the loss functions unit 207 of the transition videos, according to the embodiments of the disclosure.

Referring to FIG. 10, the reference numeral 1001 depicts the features of the isolated events and the reference numeral 1002 depicts features at transition. The contrastive loss extracts the feature vectors belonging to same embedding space. The diffusion model is constrained to generate transition frames that emit spatial similarity. The diffusion model determines the loss in the generated frames 301, 1210 while calculating the motion of the transition video to produce visually appropriate and uniform transition in the video clips. The loss may bring the style components from second video into the transition frames, while holding content from first video.

Figure 11A:
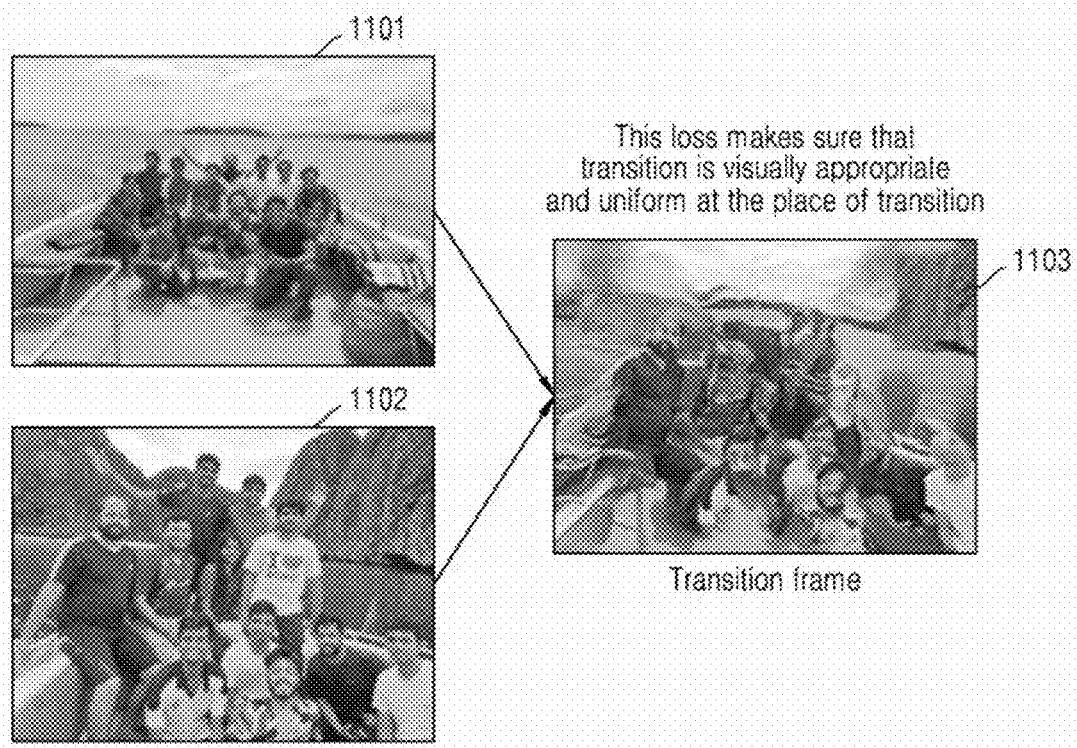
FIG. 11A is a visual representation that illustrates images or videos after transition by applying sampled softmax (SSM) contrastive loss, according to the embodiments of the disclosure.

Loss=Diffusion Loss+SSM Contrastive Loss+Transition Loss+Motion Loss $$\text{SSM Contrastive Loss} = L_0(x) = \left(\frac{1}{m}\right)\sum_{k=0}^{m} \alpha N^k - \left(\frac{1}{m}\right)\sum_{k=0}^{m} P^k$$

here, $P^k$ (+) and $N^k$ (−) denote a $k^{th}$ positive/negative sample respectively a is weighting factor <<1

$$\text{Transition Loss} = L_1(x) = \alpha L_{content} + \beta L_{style}$$

$$L_{content} = \left(\frac{1}{2}\right)\sum_{i,j}\left(F_{ij}^l - P_{ij}^l\right)^2$$

here, $F_{ij}^1$ and $P_{ij}^1$ are feature representation in layer 1 for generated and original transition $$E_l = \left(\frac{1}{2N_l^2 M_l^2}\right)\sum_{i,j}\left(G_{ij}^l - A_{ij}^l\right)^2$$

here, $G^1$ and $A^1$ are style representations in layer 1 for generated and original frame A layer with $N_1$ distinct filters has $N_1$ feature maps each of size $M_1$ $$L_{style} = \sum_{l=0} w_l E_l$$

here, $w_1$ are weighting factors of the contribution of each layer to the total loss.

$$\text{Motion Loss} = L_{flow} = \sum_x |w(x) - wGT(x)|_2$$

here, $|\cdot|_2$ computes the L2 norm of a difference b/w ground truth and predicted flow FIG. 11A is a visual representation that illustrates the images or videos after transition by applying the SSM contrastive loss, according to the embodiments of the disclosure.

Referring to the FIG. 11A, the initial video clip 1101 showcases a gathering of individuals, while the subsequent clip 1102 portrays a distinct set of people with a differing backdrop. The outcome of this combination is depicted in the form of a resultant video clip 1103. The creation of the transitioned frames between these two clips takes into account both the initial 1101 and the subsequent video clips 1102 to produce the transition video. The third transitioned frame 1103 embodies the visual impact produced by the SSM contrastive loss. The SSM contrastive loss guarantees a seamless and consistent transition at the point of convergence.

The SSM contrastive loss ensures that transition effect between the frames of the first event and the frames of the second event that is visually appropriate and uniform at the location of transition.

FIG. 11B is a visual representation of images or videos after transition by applying the transition loss, according to the embodiments of the disclosure. The transition loss brings the style parameters of the frame of the event into the frame of the second event for effective and accurate transition.

With reference to the FIG. 11B, the visual impact generated by the transition loss. In order to effectuate the seamless and precise transition, the style of the second video is blended into the first video for an effective and accurate transition 1106 using the first image frames 1104 and the second image frames 1105. The loss function facilitates the integration of the style components from the second video into the transition frames, while retaining the content of the first video. The content pertains to the frame appearing at the end of the first video, at the transition index. On the other hand, the transition index refers the style relating to the frame in the initial frame of the second video.

FIG. 11C is a visual representation that illustrates the impact and role of motion loss of the diffusion model by guiding the diffusion model to generate transition which is adaptive to content, according to the embodiments of the disclosure. The motion loss generates creative and new transition effect in the masked frames between the first event and the second event that is adaptive to the transition parameter, based on the motion of pixels.

With reference to the FIG. 11C, the visual impact generated by the motion loss is disclosed. The creative transition effect generates from the two different pictures (1107, 1108). The motion loss brings creativity to the transition effects while maintaining the seamless flow of the transition. The motion estimation guides the diffusion model to generate the smooth and seamless transitions 1109 and effects, more natural and content-specific transitions, and fast and subtle motions that are difficult to generate.

FIG. 12A is a block diagram that illustrates a dynamic prompt generator 203 for generating the contextual transition effects within the videos, according to the embodiments of the disclosure. With reference to the FIG. 12A, the input video 301, 1210 or image frames are fed to a multi-model dense video captioning unit (video captioning circuit) 1240, an emotion recognition unit (emotion recognition circuit) 1250, and a video recognition unit (video recognition circuit) 1260. Along with the image frames 301, 1210, the transition index 1220 is also given as the input. The transition index is used to include the masked frames 317 at the indexed locations.

Figure 12B:
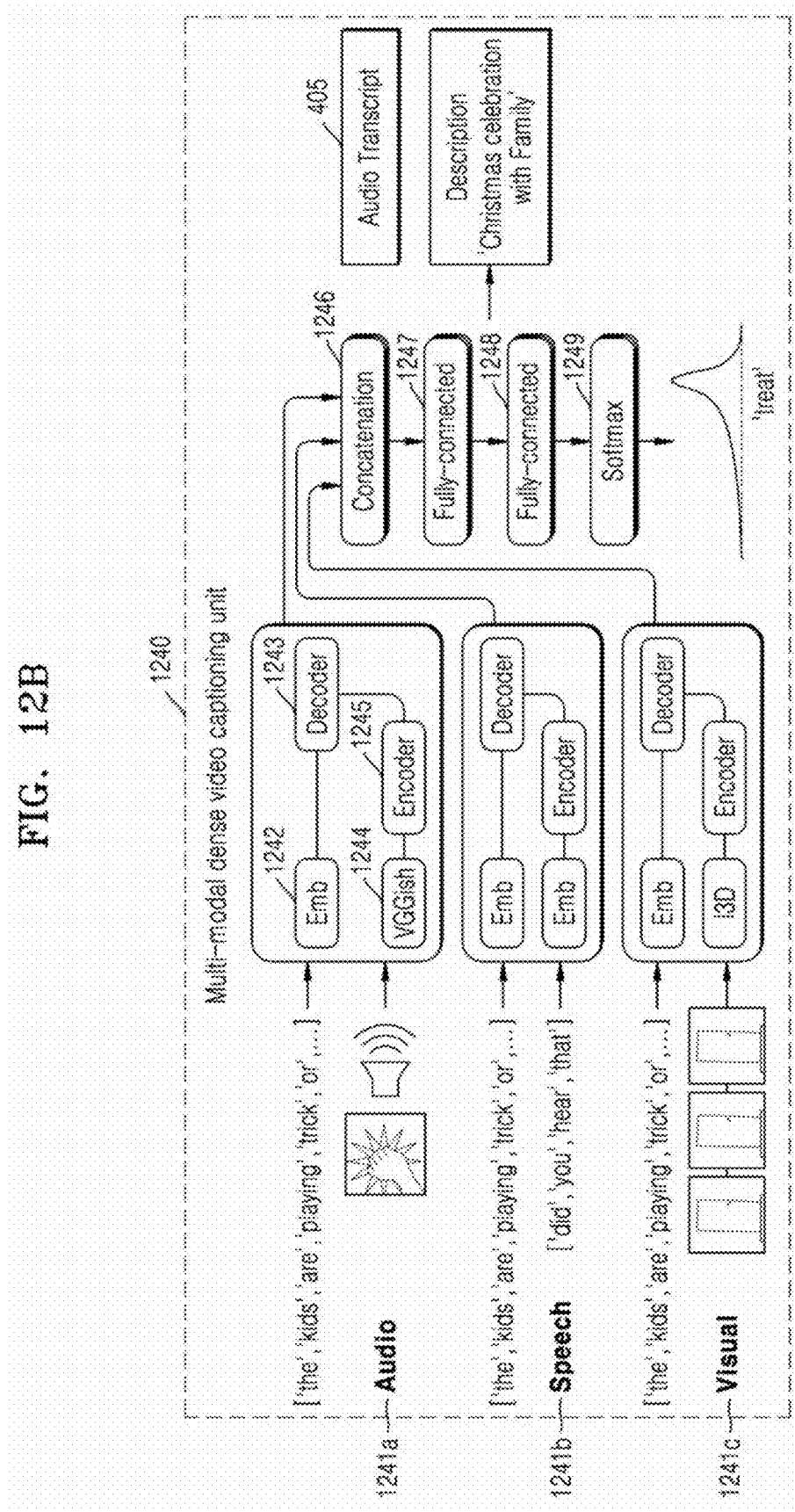
FIG. 12B is a block diagram that illustrates a multi-modal dense video captioning unit for generating the contextual transition effects within the videos, according to the embodiments of the disclosure.

FIG. 12B is a block diagram that illustrates a multi-modal dense video captioning unit for generating the contextual transition effects within the videos, according to the embodiments of the disclosure.

The multi-model dense video captioning unit 1240 may generate the audio transcripts 405 and description for the input image frames 301, 1210. The audio transcripts 405 may provide the description for the input image frames 301, 1210. The description may be generated based on the inputs audio 1241a, the speech 1241b, and the visuals 1241c. Considering, the audio 1241a in the image frames 301, 1210, and the audio 1241a may be processed to determine the context. The context can be, for example, kids in the video, play action in the video, trick performed in the video, and the like. the audio is inputted to the multi-model dense video captioning unit to generate the audio transcripts. The multi-model dense video captioning unit 1240 may include an encoder 1245, an embedding layer 1242, and a decoder 1243. The encoder 1245 converts raw video frames into a format suitable for processing by the video captioning unit 1240 using an Artificial intelligence (AI) model. A CNN can include the encoder for instance. In an example, the VGG 1244 is a specific encoder 1245 tailored for object recognition tasks. The embedding layer 1242 maps discrete tokens into continuous vector representations. The decoder 1243 may generate natural language descriptions based on the information gathered from the video clips. The decoder 1243 may utilize techniques such as Recurrent Neural Networks (RNNs), transformers, or other sequence-to-sequence models. The audio inputs are correlated with the visuals of the image frames 301, 1210. The outputs of the audio, the speech, and the visual are considered and concatenated 1246. Based on the concatenated 1246, results are provided as "the description can be found as a Christmas event celebration with family", for example. The description can be a party, a family function, friends' reunion, a travel vlog and the like and not limited to only Christmas event.

Figure 12C:
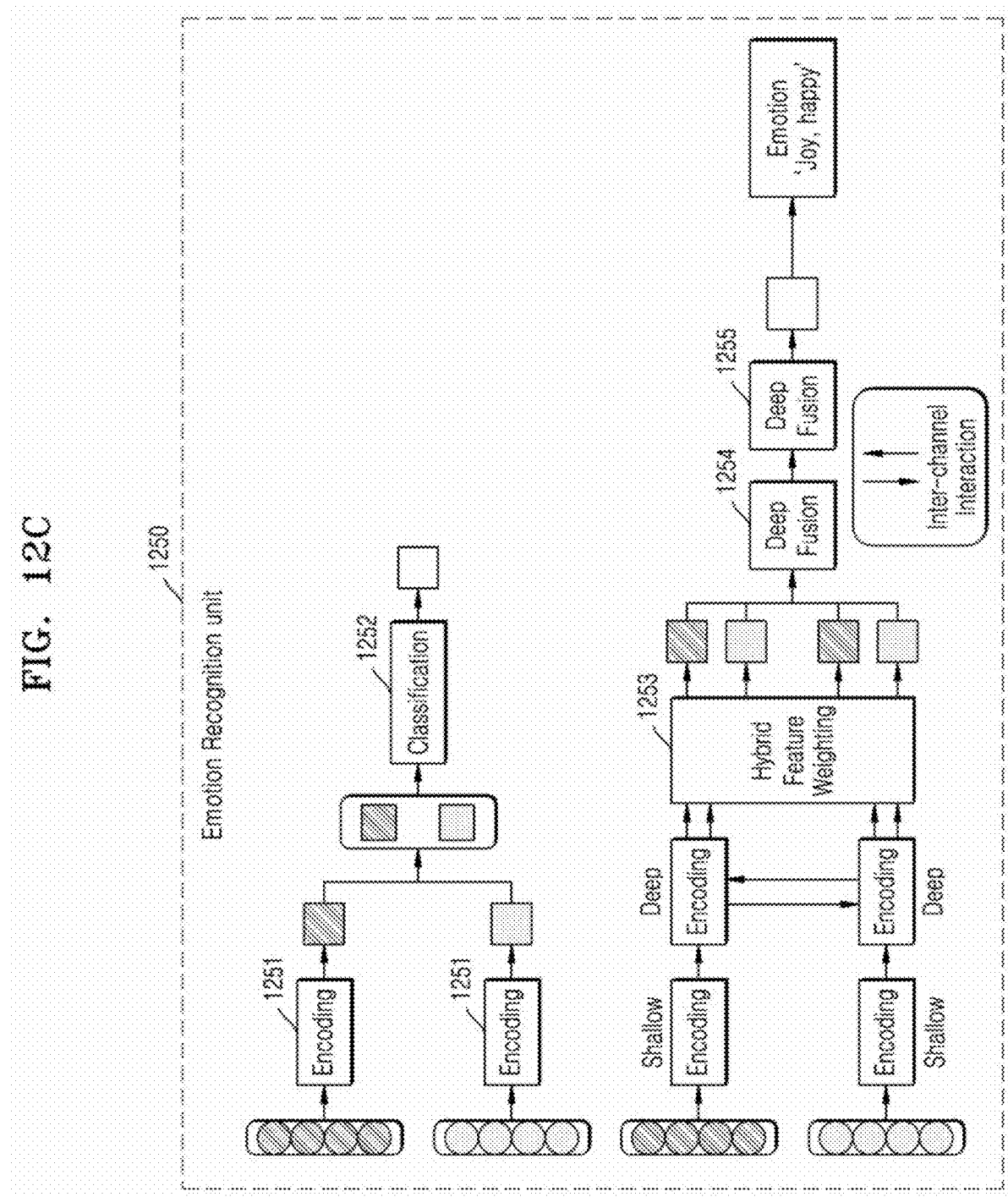
FIG. 12C is a block diagram that illustrates a emotion recognition unit for generating the contextual transition effects within the videos, according to the embodiments of the disclosure.

FIG. 12C is a block diagram that illustrates a emotion recognition unit for generating the contextual transition effects within the videos, according to the embodiments of the disclosure.

The emotion recognition unit 1250 may include an encoding unit 1251, a classification unit 1252, a hybrid feature weighting unit 1253, a deep fusion unit 1254, and a clip text encoder 1290. The clip text encoder 1290 is responsible for encoding textual information related to emotions. The clip text encoder 1290 may use techniques such as RNNs, transformers, or other natural language processing models to convert text into a format suitable for processing for recognizing emotions. The hybrid feature weighting component 1253 assign different weights to features extracted from different modalities (e.g., video, audio, text) to contribute differently to the overall emotion recognition process. The deep fusion 1254 is a technique used to combine information from different modalities at a deeper level in the network. The deep fusion 1254 goes beyond simple feature concatenation or early fusion, allowing the model to learn more complex relationships between the modalities. The classification unit 1252 includes the fused features used for classifying the emotion. The hybrid feature weighting captures the complementarity between facial expression features and their contexts via a cross-channel attention operation and obtain the optimal feature weights. The deep fusion integrates the adaptive emotion features using hybrid feature weights to classify an individual emotional state.

FIG. 12D is a block diagram that illustrates a video recognition unit for generating the contextual transition effects within the videos, according to the embodiments of the disclosure.

The video recognition unit 1260 determines the class of the video from the series of input frames 1261. The 3D convolution neural network (e.g., X3D) is used to extract spatial and temporal features efficiently from the input frames 1261.

The contrastive language-image pre-training (CLIP) text encoder 1290 is a text-transformer model that extracts efficient text representations that can provide meaningful context. The CLIP text encoder 1290 is a text-transformer model that extracts efficient text representations that can provide meaningful context.

Figure 13:
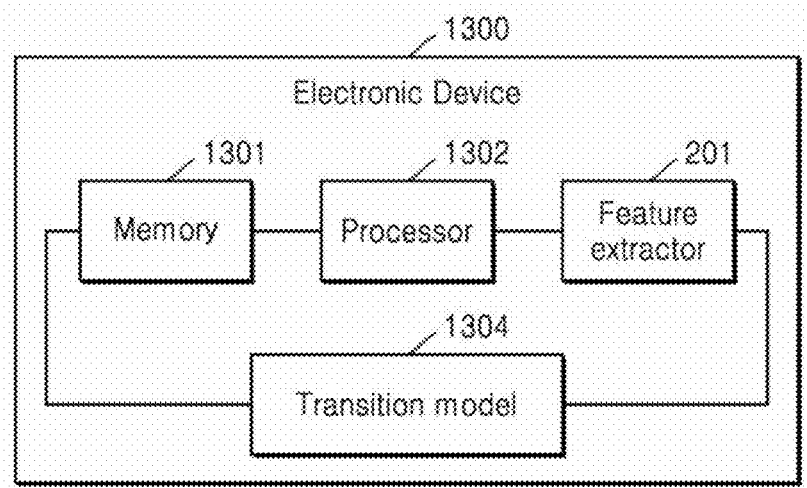
FIG. 13 is a block diagram illustrating the electronic device for generating the contextual transition effects within the videos, according to the embodiments of the disclosure.

FIG. 13 is a block diagram illustrating the electronic device 1300 for generating the contextual transition effects within the videos, according to the embodiments of the disclosure. The electronic device 1300 can be but not limited to a laptop, a palmtop, a desktop, a mobile phone, a smart phone, Personal Digital Assistant (PDA), a tablet, a wearable device, an Internet of Things (IoT) device, a virtual reality device, a television, a connected car, a foldable device, a flexible device, a display device and an immersive system.

In an embodiment, the electronic device 1300 includes a memory 1301, a processor 1302, a feature extractor 201, and a transition model 1304.

The memory 1301 is configured to store instructions to be executed by the processor 1302. The memory 1301 can include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories. In addition, the memory 1301 may, in some examples, be considered a non-transitory storage medium. The term "non-transitory" can indicate that the storage medium is not embodied in a carrier wave or a propagated signal. However, the term "non-transitory" should not be interpreted that the memory 1301 is non-movable. In some examples, the memory 1301 is configured to store larger amounts of information. In certain examples, a non-transitory storage medium can store data that can, over time, change (e.g., in Random Access Memory (RAM) or cache).

The processor 1302 may include or correspond to one processor or a plurality of processors. The one processor or the plurality of processors may correspond to a general-purpose processor, such as a central processing unit (CPU), an application processor (AP), or the like, a graphics-only processing unit such as a graphics processing unit (GPU), a visual processing unit (VPU), and/or an AI-dedicated processor 1302 such as a neural processing unit (NPU). The processor 1302 can include multiple cores and is configured to execute the instructions stored in the memory 1301.

In an embodiment, the plurality of image frames 301, 1210 are given as input to the feature extractor 201 to perform the feature extraction. The feature extraction may be used for various purposes such as image recognition purpose, object detection purpose and computer vision applications. The pre-processing may be performed before extracting the features from the video clips. The pre-processing may include at least one of the resizing process, noise reduction process and colour normalization process, for example. The feature extractor 201 may identify number of objects in the video frames given as input.

The transition model 1304 identifies inter/intra video transition boundaries using similarity between the frames.

In an embodiment, the transition model 1304 may receive the plurality of frames to determine transition components. The transition model 1304 may estimate the motion of pixels of the transition frames and the motion loss may be used to guide towards optimal minima for generating the transition frames, during the training process (only). The transition effects may be created based on the transition components. The transition model process determines the transition effects to be applied between the frames. The transition model generates the new frames with transition effects between the frames of two events.

FIG. 14 is a flow diagram that illustrates a method for generating the contextual transition effects within the videos, according to the embodiments of the disclosure.

Referring to the FIG. 14, at operation 1401, the plurality of frames are received for the videos.

At operation 1402, the degree of similarity between the frames are determined. Further, the occurrence of change from the first event and the second event of the videos are determined. Further, the transitional boundaries are determined. Thereafter, location in the frames to insert masked frames based on the transitional boundaries.

At operation 1403, the location within the frames is established based on the occurrence of change between the first and second events.

At operation 1404, the masked frames 317 are deftly inserted at this location, between the frames of said events.

At operation 1405, the transition components are meticulously assessed in both the first and second events of the videos.

At operation 1406, precise analysis of pixel motion relative to the transition components across the frames of both events is conducted.

At operation 1407, the contextual transition effects are created in the masked frames 317 between the first event and the second event based on the motion pixels of the transition components. The events are not limited to only second event. The events can be the plurality of events. The contextual transition effects in the masked frames 317 are created by updating the motion of pixels of the masked frames 317 in synchronization with the determined motion of pixels of the transition components. The transition components include the objects in frames, the object of attention in the frames, the additional parameters of the videos, the audio transcripts 405 from the frames, the emotion parameters 307 of the user from the frames, the description parameter of the frames, the class parameter of frames, and the auxiliary prompt 306 of the frames.

The contextual transition effects are applied between the frames of the first event and the second event of the videos based on the location of the frames. The transitional video is generated by including the contextual transition effects applied between the frames of the first event and the frames of the second event and storing the transitional video.

In an embodiment, the motion pixels are determined for the transition parameters by diffusion model. The contextual transition effects in the masked frames 317 between the first event and the second event are created based on the diffusion loss, a SSM Contrastive Loss, a transition loss, and a motion loss.

The proposed method and electronic device can be used for implicitly identifying transition components (such as frames or events) of interest through non-causal spatiotemporal attention, and intelligently detecting transition locations using the temporal similarity matrix to generate contextually appealing transitions. Additionally, the proposed method can be used to provide the diffusion probabilistic model for pixel-wise frame motion generation and learns transition generation with the loss functions, including SSM contrastive transition loss and the motion loss.

The proposed disclosure offers substantial advantages to the user in three key areas. Firstly, the proposed disclosure presents generative transitions for gallery stories that enhance user engagement. Secondly, the proposed disclosure offers intuitive transitions for scenarios such as switching from lock screen to home screen or launching applications. Lastly, the proposed disclosure provides contextual transitions for movie creation, further increasing the user's creative capabilities. The user experience is unparalleled due to the proposed generative transitions based on flow-guided video diffusion. These transitions not only enhance the visual appeal but also offer a seamless and intuitive user experience and also get meaningful transition by utilizing the full capability of the electronic devices.

The various actions, acts, blocks, steps, or the like in the method can be performed in the order presented, in a different order or simultaneously. Further, in some embodiments, some of the actions, acts, blocks, steps, or the like can be omitted, added, modified, skipped, or the like without departing from the scope of the invention.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The embodiments may be described and illustrated in terms of blocks, as shown in the drawings, which carry out a described function or functions. These blocks, which may be referred to herein as the transition component identification unit (identifier) 204, the loss functions unit (loss functions circuit) 207, the masking unit (masking circuit) 304, the video captioning unit (video captioning circuit) 1240, the emotion recognition unit (emotion recognition circuit) 1250, the video recognition unit (video recognition circuit) 1260 or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Functions related to artificial intelligence (for example, the spatio-temporal convolution neural network, the multi-model dense video captioning unit 1240) according to the disclosure are operated by a processor and a memory. The processor may include one or more processors. Here, the one or more processors may include a general-purpose processor, such as a central processing unit (CPU), an application processor, or a digital signal processor (DSP), a graphics-dedicated processor, such as a graphics processing unit (GPU) or a vision processing unit (VPU), or an artificial intelligence-dedicated processor, such as a neural processing unit (NPU). The one or more processors control input data to be processed according to predefined operation rules or artificial intelligence models, which are stored in the memory. Alternatively, when the one or more processors are artificial intelligence-dedicated processors, the artificial intelligence-dedicated processors may be designed in a hardware structure specialized for processing of a particular artificial intelligence model.

The predefined operation rules or the artificial intelligence models are made through training. Here, the statement of being made through training means that a basic artificial intelligence model is trained by a learning algorithm by using a large number of training data, thereby making a predefined operation rule or an artificial intelligence model, which is configured to perform a desired characteristic (or purpose). Such training may be performed in a device itself, in which artificial intelligence according to the disclosure is performed, or may be performed via a separate server and/or a separate system. Examples of the learning algorithm may include, but are not limited to, supervised learning, unsupervised learning, semi-supervised learning, and reinforcement learning.

The artificial intelligence model may include a plurality of neural network layers. Each of the plurality of neural network layers has a plurality of weight values and performs neural network calculations through calculations between a calculation result of a previous layer and the plurality of weight values. The plurality of weight values of the plurality of neural network layers may be optimized by a training result of the artificial intelligence model. For example, the plurality of weight values may be updated to minimize a loss value or a cost value, which is obtained from the artificial intelligence model during the process of training. An artificial neural network may include a deep neural network (DNN), and examples of the artificial neural network may include, but are not limited to, a CNN, a DNN, a recurrent neural network (RNN), a restricted Boltzmann machine (RBM), a deep belief network (DBN), a bidirectional recurrent deep neural network (BRDNN), and deep Q-Networks.

According to an embodiment of the disclosure, a method may include generating contextual transition effects in videos.

According to an embodiment of the disclosure, a method may include providing the at least one transition effect in the one or more masked frames by updating the motion of pixels of the one or more masked frames in synchronization with the determined motion of pixels of at least one transition parameter.

According to an embodiment of the disclosure, based on an end of the first event and a start of the second event, a method may include providing the at least one transition effect in the one or more masked frames.

According to an embodiment of the disclosure, based on the location of the at least one frame, a method may include applying the at least one transition effect between the at least one frame of the first event and the at least one frame of the second event. According to an embodiment of the disclosure, a method may include generating a transitional video comprising the at least one transition effect applied between the at least one frame from a plurality of frames of the first event and the at least one frame of the plurality of frames of the second event. According to an embodiment of the disclosure, a method may include storing the transitional video.

According to an embodiment of the disclosure, by analyzing the at least one frame and based on the transition components, a method may include generating dynamic prompts.

According to an embodiment of the disclosure, the at least one transition component comprises at least one of a plurality of objects in the at least one frame of the first event and the at least one frame of the second event, at least one object of attention in the at least one frame of the first event and the at least one frame of the second event, additional parameters of the at least one video, at least one audio transcripts from the at least one frame of the first event and the at least one frame of the second event, emotion parameters of a user from the at least one frame of the first event and the at least one frame of the second event, a description parameter from the at least one frame of the first event and the at least one frame of the second event, a non-causal spatiotemporal attention of the at least one frame of the first event and the at least one frame of the second event, a class parameter from the at least one frame of the first event and the at least one frame of the second event, and an auxiliary prompt from the user from the at least one frame of the first event and the at least one frame of the second event.

According to an embodiment of the disclosure, a method may include determining a degree of similarity between the plurality of frames. According to an embodiment of the disclosure, a method may include determining transitional boundaries of the plurality of frames based on the degree of similarity between the plurality of frames. According to an embodiment of the disclosure, a method may include determining the occurrence of the change from the first event of the at least one video to the second event of the at least one video, based on the transitional boundaries of the plurality of frames.

According to an embodiment of the disclosure, a method may include determining the motion of pixels for at least one transition parameter by a diffusion model. According to an embodiment of the disclosure, based on at least one of a diffusion loss, a sampled softmax (SSM) contrastive loss, a transition loss, and a motion loss, a method may include providing the at least one transition effect in the one or more masked frames between the first event and the second event.

According to an embodiment of the disclosure, an electronic device for generating contextual transition effects in videos is provided. According to an embodiment of the disclosure, the electronic device may include at least one processor, at least one memory, a feature extractor, and a transition model coupled with the at least one processor.

According to an embodiment of the disclosure, the transition model may be configured to provide the at least one transition effect in the one or more masked frames by updating the motion of pixels of the one or more masked frames in synchronization with the determined motion of pixels of at least one transition parameter.

According to an embodiment of the disclosure, the transition model may be configured to provide the at least one transition effect in the one or more masked frames, based on an end of the first event and a start of the second event.

According to an embodiment of the disclosure, the transition model may be configured to apply the at least one transition effect between the at least one frame of the first event and the at least one frame of the second event, based on the location of the at least one frame. According to an embodiment of the disclosure, the transition model may be configured to generate a transitional video comprising the at least one transition effect applied between the at least one frame from the plurality of frames of the first event and the at least one frame of the plurality of frames of the second event. According to an embodiment of the disclosure, the transition model may be configured to store the transitional video.

According to an embodiment of the disclosure, the transition model may be configured to generate dynamic prompts by analyzing the at least one frame and based on the transition components.

According to an embodiment of the disclosure, the at least one transition component comprises at least one of a plurality of objects in the at least one frame of the first event and the at least one frame of the second event, at least one object of attention in the at least one frame of the first event and the at least one frame of the second event, additional parameters of the at least one video, at least one of audio transcripts from the at least one frame of the first event and the at least one frame of the second event, emotion parameters of a user from the at least one frame of the first event and the at least one frame of the second event, a description parameter from the at least one frame of the first event and the at least one frame of the second event, a non-causal spatiotemporal attention of the at least one frame of the first event and the at least one frame of the second event, a class parameter from the at least one frame of the first event and the at least one frame of the second event, and an auxiliary prompt from the user from the at least one frame of the first event and the at least one frame of the second event.

According to an embodiment of the disclosure, the transition model may be configured to determine a degree of similarity between the plurality of frames. According to an embodiment of the disclosure, the transition model may be configured to determine transitional boundaries of the plurality of frames, based on the degree of similarity between the plurality of frames. According to an embodiment of the disclosure, the transition model may be configured to determine the occurrence of the change from the first event of the at least one video to the second event of the at least one video, based on the transitional boundaries of the plurality of frames.

According to an embodiment of the disclosure, the transition model may be configured to determine the motion of pixels for at least one transition parameter by a diffusion model. According to an embodiment of the disclosure, the transition model may be configured to provide the at least one transition effect in the one or more masked frames between the first event and the second event, based on at least one of a diffusion loss, a sampled softmax (SSM) contrastive loss, a transition loss, and a motion loss.

According to an embodiment of the disclosure, the at least one processor may be configured to provide the at least one transition effect in the one or more masked frames by updating the motion of pixels of the one or more masked frames in synchronization with the determined motion of pixels of at least one transition parameter.

According to an embodiment of the disclosure, the at least one processor may be configured to provide the at least one transition effect in the one or more masked frames, based on an end of the first event and a start of the second event.

According to an embodiment of the disclosure, the at least one processor may be configured to apply the at least one transition effect between the at least one frame of the first event and the at least one frame of the second event, based on the location of the at least one frame. According to an embodiment of the disclosure, the at least one processor may be configured to generate a transitional video comprising the at least one transition effect applied between the at least one frame from the plurality of frames of the first event and the at least one frame of the plurality of frames of the second event. According to an embodiment of the disclosure, the at least one processor may be configured to store the transitional video.

According to an embodiment of the disclosure, by analyzing the at least one frame and based on the transition components, the at least one processor may be configured to generate dynamic prompts.

According to an embodiment of the disclosure, the at least one processor may be configured to determine a degree of similarity between the plurality of frames. According to an embodiment of the disclosure, the at least one processor may be configured to determine transitional boundaries of the plurality of frames, based on the degree of similarity between the plurality of frames. According to an embodiment of the disclosure, the at least one processor may be configured to determine the occurrence of the change from the first event of the at least one video to the second event of the at least one video, based on the transitional boundaries of the plurality of frames.

According to an embodiment of the disclosure, the at least one processor may be configured to determine the motion of pixels for at least one transition parameter by a diffusion model. According to an embodiment of the disclosure, based on at least one of a diffusion loss, a sampled softmax (SSM) contrastive loss, a transition loss, and a motion loss, the at least one processor may be configured to provide the at least one transition effect.

What is claimed is:

1. A method performed by an electronic device for generating contextual transition effects in videos, the method comprises:
   obtaining a plurality of frames of at least one video;
   determining an occurrence of a change from a first event of the at least one video to a second event of the at least one video;
   determining a location in the plurality of frames, based on the occurrence of the change from the first event to the second event;
   inserting one or more masked frames at the location between at least one frame of the first event and at least one frame of the second event;
   determining at least one transition component present in the at least one frame of the first event and the at least one frame of the second event;
   estimating an optical flow of the at least one transition component across a plurality of frames of the first event and a plurality of frames of the second event using a spatio-temporal convolution neural network;
   determining values of pixels of the at least one transition component across the plurality of frames of the first event and the plurality of frames of the second event, based on the estimated optical flow of the at least one transition component; and
   based on the determined values of pixels of the at least one transition component, providing at least one transition effect in the one or more masked frames between the first event and the second event by updating the values of pixels of the one or more masked frames in synchronization with the determined values of pixels of at least one transition parameter.

2. The method of claim 1, wherein the providing the at least one transition effect in the one or more masked frames comprises, based on an end of the first event and a start of the second event, providing the at least one transition effect in the one or more masked frames.

3. The method of claim 1, further comprising:
   based on the location of the at least one frame, applying the at least one transition effect between the at least one frame of the first event and the at least one frame of the second event;
   generating a transitional video comprising the at least one transition effect applied between the at least one frame from a plurality of frames of the first event and the at least one frame of the plurality of frames of the second event; and
   storing the transitional video.

4. The method of claim 1, further comprising, by analyzing the at least one frame and based on the at least one transition component, generating dynamic prompts.

5. The method of claim 1, the at least one transition component comprises at least one of a plurality of objects in the at least one frame of the first event and the at least one frame of the second event, at least one object of attention in the at least one frame of the first event and the at least one frame of the second event, additional parameters of the at least one video, at least one audio transcripts from the at least one frame of the first event and the at least one frame of the second event, emotion parameters of a user from the at least one frame of the first event and the at least one frame of the second event, a description parameter from the at least one frame of the first event and the at least one frame of the second event, a non-causal spatiotemporal attention of the at least one frame of the first event and the at least one frame of the second event, a class parameter from the at least one frame of the first event and the at least one frame of the second event, and an auxiliary prompt from the user from the at least one frame of the first event and the at least one frame of the second event.

6. The method of claim 1, wherein the determining the occurrence of the change from the first event of the at least one video to the second event of the at least one video, based on the plurality of frames, comprises:
   determining a degree of similarity between the plurality of frames;
   determining transitional boundaries of the plurality of frames based on the degree of similarity between the plurality of frames; and
   determining the occurrence of the change from the first event of the at least one video to the second event of the at least one video, based on the transitional boundaries of the plurality of frames.

7. The method of claim 1, wherein the providing the at least one transition effect at the location between the first event and the second event comprises;
   determining the values of pixels for at least one transition parameter by a diffusion model; and
   based on at least one of a diffusion loss, a sampled softmax (SSM) contrastive loss, a transition loss, and a motion loss, providing the at least one transition effect in the one or more masked frames between the first event and the second event.

8. An electronic device for generating contextual transition effects in videos, the electronic device comprising;
   at least one processor;
   at least one memory;
   a feature extractor;
   a transition model coupled with the at least one processor, the at least one memory and the feature extractor, the transition model being configured to:
   obtain a plurality of frames of at least one video;
   determine an occurrence of a change from a first event of the at least one video to a second event of the at least one video;
   determine a location in the plurality of frames, based on the occurrence of the change from the first event to the second event;
   insert one or more masked frames at the location between at least one frame of the first event and at least one frame of the second event;
   determine at least one transition component present in the at least one frame of the first event and the at least one frame of the second event of the at least one video;
   estimate an optical flow of the at least one transition component across a plurality of frames of the first event and a plurality of frames of the second event using a spatio-temporal convolution neural network;

determine values of pixels of the at least one transition component across the plurality of frames of the first event and the plurality of frames of the second event, based on the estimated optical flow of the at least one transition component; and based on the determined values of pixels of the at least one transition component, provide at least one transition effect in the one or more masked frames between the first event and the second event by event by updating the values of pixels of the one or more masked frames in synchronization with the determined values of pixels of at least one transition parameter.

9. The electronic device of claim 8, wherein the transition model is further configured to provide the at least one transition effect in the one or more masked frames, based on an end of the first event and a start of the second event.

10. The electronic device of claim 8, wherein the transition model is further configured to:
apply the at least one transition effect between the at least one frame of the first event and the at least one frame of the second event, based on the location of the at least one frame;
generate a transitional video comprising the at least one transition effect applied between the at least one frame from the plurality of frames of the first event and the at least one frame of the plurality of frames of the second event; and
store the transitional video.

11. The electronic device of claim 10, wherein the transition model is further configured to generate dynamic prompts by analyzing the at least one frame and based on the at least one transition component.

12. The electronic device of claim 8, wherein the at least one transition component comprises at least one of a plurality of objects in the at least one frame of the first event and the at least one frame of the second event, at least one object of attention in the at least one frame of the first event and the at least one frame of the second event, additional parameters of the at least one video, at least one of audio transcripts from the at least one frame of the first event and the at least one frame of the second event, emotion parameters of a user from the at least one frame of the first event and the at least one frame of the second event, a description parameter from the at least one frame of the first event and the at least one frame of the second event, a non-causal spatiotemporal attention of the at least one frame of the first event and the at least one frame of the second event, a class parameter from the at least one frame of the first event and the at least one frame of the second event, and an auxiliary prompt from the user from the at least one frame of the first event and the at least one frame of the second event.

13. The electronic device of claim 8, wherein the transition model is further configured to:
determine a degree of similarity between the plurality of frames;
determine transitional boundaries of the plurality of frames, based on the degree of similarity between the plurality of frames; and
determine the occurrence of the change from the first event of the at least one video to the second event of the at least one video, based on the transitional boundaries of the plurality of frames.

14. The electronic device of claim 8, wherein the transition model is further configured to:

determine the values of pixels for at least one transition parameter by a diffusion model; and
provide the at least one transition effect in the one or more masked frames between the first event and the second event, based on at least one of a diffusion loss, a sampled softmax (SSM) contrastive loss, a transition loss, and a motion loss.

15. A non-transitory computer-readable storage medium storing instructions which when executed by at least one processor, cause the at least one processor to:
obtain a plurality of frames of at least one video;
determine an occurrence of a change from a first event of the at least one video to a second event of the at least one video;
determine a location in the plurality of frames, based on the occurrence of the change from the first event to the second event;
insert one or more masked frames at the location between at least one frame of the first event and at least one frame of the second event;
determine at least one transition component present in the at least one frame of the first event and the at least one frame of the second event of the at least one video;
estimate an optical flow of the at least one transition component across a plurality of frames of the first event and a plurality of frames of the second event using a spatio-temporal convolution neural network;
determine values of pixels of the at least one transition component across the plurality of frames of the first event and the plurality of frames of the second event, based on the estimated optical flow of the at least one transition component; and
based on the determined values of pixels of the at least one transition component, provide at least one transition effect in the one or more masked frames between the first event and the second event by updating the values of pixels of the one or more masked frames in synchronization with the determined values of pixels of at least one transition parameter.

16. The non-transitory computer-readable storage medium of claim 15, wherein the at least one processor further configured to:
provide the at least one transition effect in the one or more masked frames, based on an end of the first event and a start of the second event.

17. The non-transitory computer-readable storage medium of claim 15, wherein the at least one processor further configured to:
apply the at least one transition effect between the at least one frame of the first event and the at least one frame of the second event, based on the location of the at least one frame;
generate a transitional video comprising the at least one transition effect applied between the at least one frame from the plurality of frames of the first event and the at least one frame of the plurality of frames of the second event; and
store the transitional video.

18. The non-transitory computer-readable storage medium of claim 15, wherein the at least one processor further configured to:
determine a degree of similarity between the plurality of frames;
determine transitional boundaries of the plurality of frames, based on the degree of similarity between the plurality of frames; and determine the occurrence of the change from the first event of the at least one video to the second event of the at least one video, based on the transitional boundaries of the plurality of frames.

\* \* \* \* \*